(12) United States Patent
Tabata

(10) Patent No.: US 6,817,965 B2
(45) Date of Patent: Nov. 16, 2004

(54) APPARATUS FOR CONTROLLING VEHICLE DRIVE SYSTEM INCLUDING ENGINE WITH TURBOCHARGER, AND LOCK-UP CLUTCH

(75) Inventor: Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 41 days.

(21) Appl. No.: 10/438,890

(22) Filed: May 16, 2003

(65) Prior Publication Data
US 2003/0195084 A1 Oct. 16, 2003

Related U.S. Application Data

(63) Continuation of application No. 09/899,910, filed on Jul. 9, 2001, now Pat. No. 6,607,467.

(30) Foreign Application Priority Data

| Jul. 11, 2000 | (JP) | 2000-209659 |
| Jul. 11, 2000 | (JP) | 2000-209660 |
| May 14, 2001 | (JP) | 2001-143321 |
| May 15, 2001 | (JP) | 2001-144259 |

(51) Int. Cl.$^7$ ............................................. F02D 23/00
(52) U.S. Cl. ................................... 477/33; 701/59
(58) Field of Search ............................. 477/33; 701/59

(56) References Cited

U.S. PATENT DOCUMENTS

| 4,669,441 A | 6/1987 | Okimoto |
| 4,858,496 A | * 8/1989 | Iwatsuki et al. ............... 477/33 |
| 5,125,292 A | 6/1992 | Matsuoka et al. |
| 5,226,351 A | 7/1993 | Matsuoka et al. |
| 5,307,783 A | 5/1994 | Satoya et al. |
| 6,607,467 B2 | * 8/2003 | Tabata ....................... 477/33 |

FOREIGN PATENT DOCUMENTS

| JP | A 4-228825 | 8/1992 |
| JP | A 7-156691 | 6/1995 |
| JP | B2 2517171 | 4/1996 |
| JP | B2 2534995 | 6/1996 |
| JP | A 9-166212 | 6/1997 |
| JP | A 11-117785 | 4/1999 |
| JP | A 2000-27987 | 1/2000 |

* cited by examiner

Primary Examiner—Dirk Wright
(74) Attorney, Agent, or Firm—Oliff & Berridge, PLC

(57) ABSTRACT

An apparatus for controlling a lock-up clutch disposed in a drive system of an automotive vehicle which includes a lean-burn engine provided with a turbocharger. The apparatus is arranged to place the lock-up clutch in a fully engaged state and/or a slip control state while a running condition of the automotive vehicle is in a predetermined engaging area or slip control area of the lock-up clutch. The apparatus includes an engaging-area changing device operable to change the engaging area of the lock-up clutch, on the basis of a turbocharging pressure established by the turbocharger, and/or slip-control-area changing means for changing the slip control area, on the basis of the turbocharging pressure. Also disclosed is an apparatus for controlling a lean-burn engine provided with a turbocharger, which apparatus includes a device for changing a range of an air/fuel ratio of an air-fuel mixture of the engine for a given turbocharging pressure, on the basis of at least one of operating state and slipping state of the lock-up clutch.

4 Claims, 21 Drawing Sheets

FIG. 2

|     | C0 | C1 | C2 | B0 | B1 | B2 | B3 | B4 | F0 | F1 | F2 |
|-----|----|----|----|----|----|----|----|----|----|----|----|
| P   | ○  |    |    |    |    |    |    |    | ○  |    |    |
| R   |    |    | ○  | ○  |    |    |    |    |    |    |    |
| N   | ○  |    |    |    |    |    |    |    |    |    |    |
| 1st | ○  | ○  |    |    |    |    |    |    | ○  |    | ○  |
| 2nd | ◎  | ○  |    |    | ◎  |    |    | ◎  | ○  |    |    |
| 3rd | ○  | ○  |    |    |    |    | ○  |    | ○  |    |    |
| 4th | ○  | ○  | ○  |    |    | △  |    |    | ○  |    |    |
| 5th |    | ○  | ○  | ○  |    | △  |    |    | ○  |    |    |

○ ENGAGED  ◎ ENGAGED FOR ENGINE BRAKE APPLICATION  △ ENGAGED (NOT CONTRIBUTING TO TRANSMISSION OF POWER)

12: CLUTCH
14: TORQUE CONVERTER
66: HYDRAULIC CONTROL UNIT

APPARATUS FOR CONTROLLING VEHICLE DRIVE SYSTEM INCLUDING ENGINE WITH TURBOCHARGER, AND LOCK-UP CLUTCH

This is a Continuation of application Ser. No. 09/899,910 filed Jul. 9, 2001 now U.S. Pat. No. 6,607,467. The entire disclosure of the prior application is hereby incorporated by reference herein in its entirety.

This application is based on Japanese Patent Application Nos. 2000-209659 and 2000-209660 both filed on Jul. 21, 2000, 2001-143321 on filed May 14, 2001, and 2001-144259 filed on May 15, 2001, the contents of which are incorporated hereinto by reference.

BACKGROUND OF THE INVENTION

1. Field of the Invention

The present invention relates to a control apparatus for controlling a lock-up clutch provided on an automotive vehicle, and more particularly to techniques for improving fuel economy of a lean-burn engine provided with a turbocharger (turbo-supercharger), by holding the lock-up clutch in an engaged or slipping state in a relatively wide range or area of running condition of the vehicle while the engine is placed in a relatively stable combustion state. The present invention is also concerned with a control apparatus for controlling such a lean-burn engine provided with a turbocharger.

2. Discussion of Related Art

For controlling a lean-burn engine provided with a turbocharger so as to operate the engine with a relatively high degree of fuel economy in a wide range or area of running condition of the vehicle, it has been proposed to determine the manner of controlling the speed ratio of an automatic transmission so as to enable the vehicle to run in a steady state while the engine is operated at a relatively low speed in its turbocharging state. An example of such a transmission control apparatus is incorporated in a vehicle control apparatus disclosed in JP-A-7-156691. This transmission control apparatus permits the engine to operate at a low speed in the turbocharging state, that is, with high fuel economy, in a comparatively wide range of running condition of the vehicle, so that the fuel economy of the engine can be significantly enhanced.

In the automotive vehicle equipped with the vehicle control apparatus described above, the speed ratio of the automatic transmission is controlled to enlarge the range or area of the running condition of the vehicle in which the engine is operated at a low speed in its turbocharging state with a relatively high degree of stability of its combustion state. However, the range of the vehicle running condition in which the lock-up clutch is placed in its engaged state is not considered to improve the fuel economy of the lean-burn engine with the turbocharger. In this respect, there is still a room for improvement of the lean-burn engine provided with the turbocharger.

In an automotive vehicle including a lean-burn engine provided with a turbocharger, the intake air quantity can be generally increased by operating the turbocharger under a non-full-load condition, so that the engine can be a lean-burn state under the non-full-load condition. Further, the engine in the turbocharging state can be operated with a comparatively high degree of stability in its combustion state, so that the upper limit of the air/fuel ratio of the air-fuel mixture can be increased. However, increasing the air/fuel ratio tends to cause undesirable vibration or surge of the engine, which deteriorates the running comfort of the vehicle. In this respect, there is a limitation in the upper limit of the air/fuel ratio of the air-fuel mixture, so that the lean-burn operation of the engine is limited to prevent the surge of the engine.

JP-A-11-117785 proposes an engine control technique for maximizing the upper limit of the air/fuel ratio of the air-fuel mixture in the lean-burn operation of the engine under a non-full-load condition. According to this engine control technique, the air/fuel ratio of the air-fuel mixture is controlled by changing the intake air quantity relative to the fuel amount, by controlling the turbocharging pressure to be established by the turbocharger of the engine. The turbocharging pressure is controlled so that the actual degree of surge of the engine coincides with a predetermined target value.

However, the known engine control technique indicated above does not take into account an influence of the operating state of the lock-up clutch on the surge of the engine. Accordingly, the known engine control technique does not permit the lean-burn operation of the engine with a sufficiently high air/fuel ratio of the air-fuel mixture, in relation to the specific operating state of the lock-up clutch.

SUMMARY OF THE INVENTION

It is therefore a first object of the present invention to provide a control apparatus for controlling a lock-up clutch provided on an automotive vehicle, which apparatus permits a further improvement in the fuel economy of a lean-burn engine of the vehicle provided with a turbocharger.

It is a second object of this invention to provide a control apparatus for controlling a lean-burn engine of an automotive vehicle provided with a turbocharger, which permits the engine to be operated in a lean-burn state with the air/fuel ratio of the air-fuel mixture being variable over a sufficiently wide range, in relation to the specific operating state of the lock-up clutch, while presenting or reducing the surge of the engine.

The first object indicated above may be achieved according to a first aspect of this invention, which provides an apparatus for controlling a lock-up clutch disposed in a drive system of an automotive vehicle which includes a lean-burn engine provided with a turbocharger, the apparatus being arranged to place the lock-up clutch in a fully engaged state while a running condition of the automotive vehicle is in a predetermined engaging area of the lock-up clutch, the apparatus being characterized by comprising engaging-area changing means for changing the engaging area of the lock-up clutch, on the basis of a turbocharging pressure established by the turbocharger.

In the lock-up clutch control apparatus constructed according to the first aspect of this invention described above, the engaging-area changing means is arranged to change the engaging area of the lock-up clutch, on the basis of the turbocharging pressure established by the turbocharger, so that the engaging area can be enlarged with an increase in the turbocharging pressure while the lean-burn engine provided with the turbocharger is placed in the turbocharging lean-burn state in which the combustion state of the engine is relatively stable with the turbocharging pressure being relatively high, whereby the torque transmission efficiency of the engine can be maximized so as to improve the fuel economy of the engine.

In one preferred form of the lock-up clutch control apparatus according to the first aspect of the present invention, the engaging-area changing means is operable to enlarge the engaging area of the lock-up clutch with an increase in said turbocharging pressure. In this form of the invention wherein the engaging-area changing means enlarges the engaging area of the lock-up clutch as the turbocharging pressure is increased, the torque transmission efficiency of the engine can be improved to thereby enhance the fuel economy of the engine as the turbocharging pressure is raised in the turbocharging lean-burn state of the engine in which the combustion state is relatively stable.

In another preferred form of the first aspect of the invention, the apparatus further comprises engine torque control means for controlling the lean-burn engine such that an output torque of the lean-burn engine is held constant, on the basis of the turbocharging pressure and an air/fuel ratio of an air-fuel mixture introduced in the engine. In this form of the lock-up clutch control apparatus, the air/fuel ratio of the air-fuel mixture is increased with an increase in the turbocharging pressure, for holding the output torque of the engine constant, so that the fuel economy is further improved while the engine is operated under a low-speed high-load condition, that is, operated at a relatively low speed and in the turbocharging state.

The second object indicated above may be achieved according to a second aspect of this invention, which provides an apparatus for controlling a lock-up clutch disposed in a drive system of an automotive vehicle which includes a lean-burn engine provided with a turbocharger, the apparatus being arranged to place the lock-up clutch in a slip control state while a running condition of the automotive vehicle is in a predetermined slip control area of the lock-up clutch, the apparatus being characterized by comprising slip-control-area changing means for changing the slip control area of the lock-up clutch, on the basis of a turbocharging pressure established by the turbocharger.

In the lock-up clutch control apparatus constructed according to the second aspect of this invention, the slip-control-area changing means is arranged to change the slip control area of the lock-up clutch, on the basis of the turbocharging pressure established by the turbocharger, so that that the slip control area of the lock-up clutch can be enlarged with an increase in the turbocharging pressure while the lean-burn engine provided with the turbocharger is placed in the turbocharging lean-burn state in which the combustion state of the engine is relatively stable with the turbocharging pressure being relatively high, whereby the torque transmission efficiency of the engine can be maximized so as to improve the fuel economy of the engine.

In one preferred form of the lock-up clutch control apparatus according to the second aspect of this invention, the slip-control-area changing means is operable to enlarge the slip control area of the lock-up clutch with an increase in the turbocharging pressure. In this preferred form of the apparatus wherein the slip-control-area changing means enlarges the slip control area of the lock-up clutch as the turbocharging pressure is increased, the torque transmission efficiency of the engine can be improved to thereby enhance the fuel economy of the engine as the turbocharging pressure is raised in the turbocharging lean-burn state of the engine in which the combustion state is relatively stable.

In another preferred form of the second aspect of the invention, the lock-up clutch control apparatus further comprises engine torque control means for controlling the lean-burn engine such that an output torque of the lean-burn engine is held constant, on the basis of the turbocharging pressure and an air/fuel ratio of an air-fuel mixture introduced in the engine. In this form of the lock-up clutch control apparatus, the air/fuel ratio of the air-fuel mixture is increased with an increase in the turbocharging pressure, for holding the output torque of the engine constant, so that the fuel economy is further improved while the engine is operated under a low-speed high-load condition, that is, operated at a relatively low speed and in the turbocharging state.

The second object indicated above may be achieved according to a third aspect of the present invention, which provides an apparatus for controlling a lean-burn engine provided with a turbocharger disposed in a drive system of an automotive vehicle which includes a lock-up clutch, the lean-burn engine being operated with an air-fuel mixture whose air/fuel ratio for a given value of a turbocharging pressure to be established by the turbocharger is variable in a predetermined air/fuel ratio range, the apparatus being characterized by comprising air/fuel-ratio-range changing means for changing the air/fuel ratio range, on the basis of at least one of an operating state and a slipping state of the lock-up clutch.

In the present lean-burn engine control apparatus according to the third aspect of this invention described above, the air/fuel-ratio-range changing means is arranged to change the air/fuel ratio range for a given value of the turbocharging pressure of the lean-burn engine, on the basis of the operating state and/or the slipping state of the lock-up clutch. Where the air/fuel-ratio-range changing means is arranged to change the air/fuel ratio range on the basis of at least the operating state (fully engaged state, fully released state or slip control state) of the lock-up clutch, the upper limit of the air/fuel ratio range can be made relatively high when the lock-up clutch is placed in the fully released state or a state near the fully released state. Accordingly, the lean-burn engine provided with the turbocharger can be operated in a lean-burn state with the air/fuel ratio of the air-fuel mixture being variable over a sufficiently wide range, in relation to the operating state of the lock-up clutch, while presenting or reducing the surge of the engine.

Where the air/fuel-ratio-range changing means is arranged to change the air-fuel ratio range on the basis of at least the slipping state of the lock-up clutch, the upper limit of the air/fuel ratio range can be increased depending upon the slipping state or slip ratio of the lock-up clutch. Thus, the present arrangement permits the lean-burn engine to be operated in a lean-burn state with the air/fuel ratio being variable over a sufficiently wide range, in relation to the slipping state of the lock-up clutch, while reducing the surge of the engine.

In one preferred form of the lean-burn engine control apparatus according to the third aspect of this invention, the air/fuel-ratio-range changing means changes the air/fuel ratio range on the basis of both of the operating state and the slipping state of the lock-up clutch.

In the above preferred form of the lean-burn engine control apparatus wherein the air/fuel ratio range is changed on the basis of the operating state and the slipping state of the lock-up clutch, the upper limit of the air/fuel ratio range can be made relatively high when the lock-up clutch is in the fully released state or a state near the fully released state, and can be increased with an increase in the slip ratio of the lock-up clutch. Accordingly, the lean-burn engine provided with the turbocharger can be operated in a lean-burn state with the air/fuel ratio of the air-fuel mixture being variable over a sufficiently wide range, in relation to the operating state of the lock-up clutch, while presenting or reducing the surge of the engine.

In another preferred form of the lean-burn engine control apparatus, the air/fuel-ratio-range changing means changes the air/fuel ratio range such that the air/fuel ratio range is wider when the lock-up clutch is placed in a fully released state than when the lock-up clutch is not placed in the fully released state. In this form of the lean-burn engine control apparatus, the air/fuel ratio range is wider in the fully released state of the lock-up clutch, than in the fully engaged state, so that the engine is less likely to suffer from a surge or vibration in the fully released state of the lock-up clutch, since the surge is more likely to be absorbed by the lock-up clutch in the fully released state than in the fully engaged state. Accordingly, the engine can be operated in a lean-burn state with a sufficiently high air/fuel ratio of the air-fuel mixture in the fully released state of the lock-up clutch.

In a further preferred form of the lean-burn engine control apparatus, the air/fuel-ratio-range changing means includes air/fuel-ratio changing means for increasing the air/fuel ratio of the air-fuel mixture with an increase in the turbocharging pressure. In a still further preferred form of the lean-burn engine control apparatus, the air-fuel-ratio-range changing means enlarges the air/fuel ratio range with an increase in the turbocharging pressure. In these preferred forms of the lean-burn engine control apparatus, the combustion state of the lean-burn engine can be stabilized when the turbocharging pressure is relatively high, thereby permitting significant reduction of the surge of the engine during a lean-burn operation with a relatively high air/fuel ratio of the air-fuel mixture. Thus, the present lean-burn engine control apparatus assures a lean-burn operation of the engine with a reduced degree of surge.

In a yet further preferred form of the lean-burn engine control apparatus, the air/fuel-ratio-range changing means enlarges the air/fuel ratio range with an increase in a slip ratio of the lock-up clutch. According to this control apparatus, the engine is less likely to suffer from a surge or vibration when the slip ratio of the lock-up clutch is relatively high, since the surge is more likely to be absorbed by the lock-up clutch when the slip ratio is relatively high, so that the engine can be operated in a lean-burn state with a sufficiently high air/fuel ratio of the air-fuel mixture when the lock-up clutch has a relatively high slip ratio.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 2 is a table indicating a relationship between combinations of frictional coupling devices placed in the engaged state in an automatic transmission of the vehicle drive system of FIG. 1, and operating positions of the automatic transmission which are established by the respective combinations;

DETAILED DESCRIPTION OF THE PREFERRED EMBODIMENTS

Figure 1:
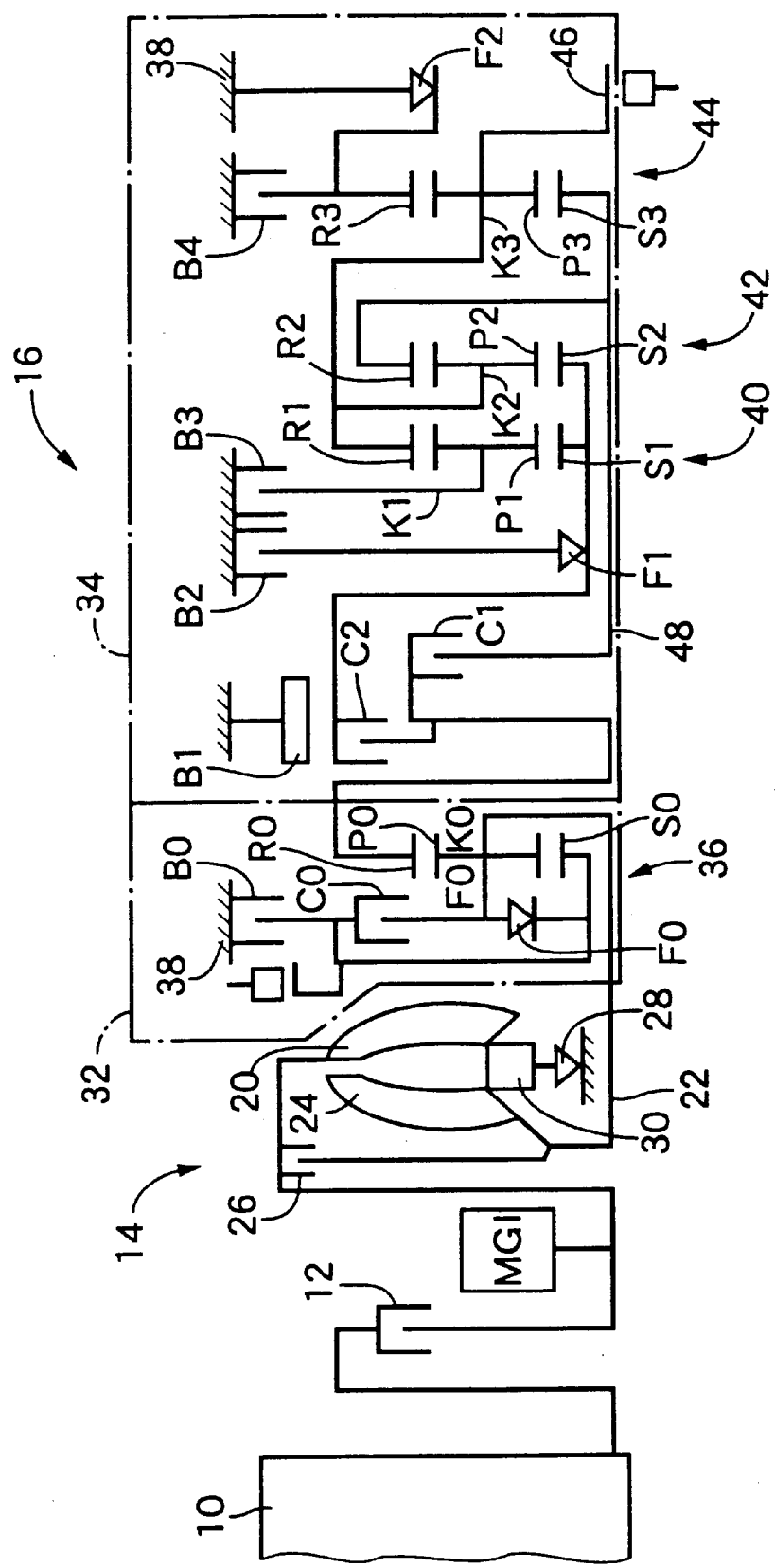
FIG. 1 is a schematic view showing a part of a drive system of an automotive vehicle having a lock-up clutch control apparatus, which is constructed according to a first embodiment of this invention.

Referring first to the schematic view of FIG. 1, there is shown an arrangement of a drive system of an automotive vehicle having a lock-up clutch control apparatus constructed according to a first embodiment of this invention. The drive system includes a drive source in the form of an engine 10, a clutch 12, a torque converter 14 and an automatic transmission 16. The output of the engine 10 is transmitted to the automatic transmission 16 through the clutch 12 and torque converter 14, and is transmitted from the automatic transmission 16 to drive wheels through a differential gear device and a drive axle, which are well known in the art and are not shown. Between the clutch 12 and the torque converter 14, there is disposed a first motor/generator MG1 which functions as an electric motor and an electric generator. The torque converter 14 includes: a pump impeller 20 connected to the clutch 12; a turbine impeller 24 connected to an input shaft 22 of the automatic transmission 16; a lock-up clutch 26 for directly connecting the pump and turbine impellers 20, 24; a one-way clutch 28; and a stator impeller 30 which is prevented by the one-way clutch from rotating in one of opposite directions.

The automatic transmission 16 includes a first transmission unit 32 having two speed positions, that is, a high-speed position and a low-speed position, and a second transmission unit 34 having five operating positions, that is, one reverse drive position and four forward drive positions. The first transmission unit 32 includes a high-low planetary gear device 36 having a sun gear S0, a ring gear R0, a carrier K0, and planetary gears P0 which are rotatably supported by the carrier K0 and which mesh with the sun gear S0 and ring gear R0. The first transmission unit 32 further includes a clutch C0 disposed between the sun gear S0 and the carrier K0, and a brake B0 disposed between the sun gear S0 and a housing 38.

The second transmission unit 34 includes a first planetary gear set 40, a second planetary gear set 42, and a third planetary gear set 44. The first planetary gear set 40 includes a sun gear S1, a ring gear R1, a carrier K1, and planetary gears P1 which are rotatably supported by the carrier K1 and which mesh with the sun gear S1 and ring gear R1. The second planetary gear set 42 includes a sun gear S2, a ring gear R2, a carrier K2, and planetary gears P2 which are rotatably supported by the carrier K2 and which mesh with the sun gear S2 and ring gear R2. The third planetary gear set 44 includes a sung gear S3, a ring gear R3, a carrier K3, and planetary gears P3 which are rotatably supported by the carrier K3 and which mesh with the sun gear S3 and ring gear R3.

The sun gears S1 and S2 are integrally connected to each other, while the ring gear R1 and carriers K1 and K2 are integrally connected to each other. The carrier K3 is connected to an output shaft 46 of the automatic transmission 16. A clutch C1 is disposed between the ring gear R0 and an intermediate shaft 48 connected to the sun gear S3, while a clutch C2 is disposed between the sun gears S1 and S2 and the intermediate shaft 48. A brake B1 for inhibiting rotation of the sun gears S1 and S2 is fixed to the housing 38. A one-way clutch F1 and a brake B2 are disposed in series with each other between the sun gears S1 and S2 and the housing 38. This one-way clutch F1 is engaged when the sun gears S1 and S2 receive a torque so as to be rotated in a direction opposite to the direction of rotation of the input shaft 22.

A brake B3 is disposed between the carrier K1 and the housing 38, while a brake B4 and a one-way clutch F2 are disposed in parallel with each other between the ring gear R3 and the housing 38. This one-way clutch F2 is engaged when the ring gear R3 receives a torque so as to be rotated in the direction opposite to the direction of rotation of the input shaft 22.

The automatic transmission 16 constructed as described above has one reverse drive position and five forward drive positions, which are selectively established by engagement of respective combinations of frictional coupling devices in the form of the clutches C0–C2, brakes B0–B4 and one-way clutches F0–F2, as indicated in the table of FIG. 2 by way of example. In FIG. 2, "○" indicates the engaged state of each frictional coupling device, and the absence of any symbol indicates the released state of each frictional coupling device. "⊚" indicates the engagement of the appropriate frictional coupling device for applying an engine brake to the vehicle, and "Δ" indicates the engagement of the appropriate frictional coupling device, which does not contribute to transmission of power. It will be understood from the table of FIG. 2 that a shift-up action of the automatic transmission 16 from a $2^{nd}$-speed position to a $3^{rd}$-speed position is a so-called "clutch-to-clutch" shifting action wherein the brake B2 is engaged while at the same time the brake B3 is released, so that there exists a period during which a drive torque is transmitted through both the brake B3 placed in the process of its releasing action and the brakes B2 placed in its engaging action. The other shifting actions of the automatic transmission 16 are performed by engaging or releasing the appropriate one of the clutches and brakes. The clutches, brakes and one-way clutches indicated above are hydraulically operated frictional coupling devices each of which is actuated by a hydraulic actuator.

The engine 10 is provided with a turbocharger (turbo-supercharger) 54, and is operated with a fuel injected into its cylinders. This engine 10 is a so-called "lean-burn" engine which is operated with an air-fuel mixture whose air/fuel ratio A/F is higher than the stoichiometric value, while the engine 10 is in a low-load condition. The engine 10 has two banks of cylinders 10A and 10B disposed on the right and left sides. Each bank consists of three cylinders. The engine 10 is arranged such that the cylinders of one of the two banks 10A, 10B or the cylinders of both of the two banks 10A, 10B are operated simultaneously. Thus, the number of the cylinders to be operated can be changed.

Figure 3:
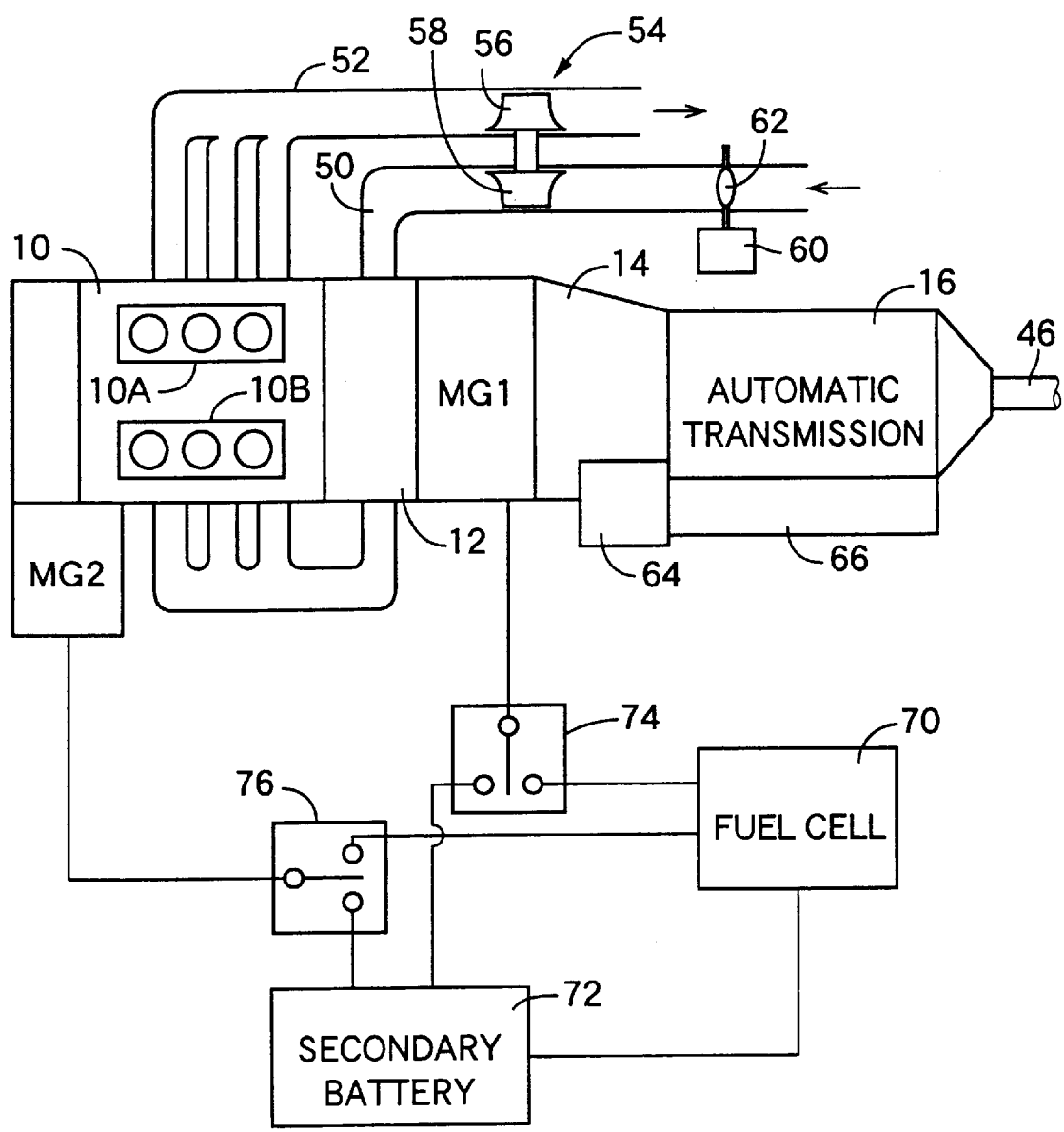
FIG. 3 is a view showing various devices associated with the engine of the vehicle drive system of FIG. 1.

As indicated in FIG. 3, the engine 10 has an intake pipe 50, an exhaust pipe 52, and the turbocharger 54 is disposed so as to bridge the intake and exhaust pipes 50, 52. The turbocharger 54 includes a turbine impeller 56 which is rotated by a stream of exhaust emission from the engine 10 through the exhaust pipe 52, and a pump impeller 58 which is disposed in the intake pipe 50 so as to compress an intake air and which is connected to the turbine impeller 56 so that the pump impeller 58 is rotated by the turbine impeller 56.

A throttle valve 62 is disposed within the intake pipe 50 of the engine 10. The throttle valve 62 is operated by a throttle actuator 60 such that an angle of opening $\theta_{TH}$ of the throttle valve 62 is in principle controlled to a value corresponding to an operating amount $\theta_{ACC}$ of an accelerator pedal (not shown). However, the angle of opening $\theta_{TH}$ determined by the operating amount $\theta_{ACC}$ is adjusted depending upon various running conditions of the vehicle, so as to adjust the output of the engine 10. For instance, the angle of operating $\theta_{TH}$ is adjusted depending upon whether the automatic transmission 16 is in a shifting action or not.

As also shown in FIG. 3, the first motor/generator MG1 is disposed between the engine 10 and the automatic transmission 16, such that the clutch 12 is disposed between the engine 10 and the first motor/generator MG1. The vehicle drive system further includes a hydraulic control unit 66 which receives a pressurized fluid from an electrically operated hydraulic pump 64 and which controls the hydraulically operated frictional coupling devices of the automatic transmission 16 and the lock-up clutch 26. A second motor/generator MG2 is operatively connected to the engine 10, as indicated in FIG. 3. The vehicle drive system further includes a fuel cell 70 and a secondary battery 72 which serve as an electric power source for the first motor/generator MG1 and the second motor/generator MG2, and also includes two switching devices 74, 76 which are arranged to control amounts of electric current to be applied from the fuel cell 70 and the secondary battery 72 to the motor/generator MG1 and motor/generator MG2 which serve as the electric motors, and amounts of electric current with which the secondary battery 72 is charged by the motor/generator MG1 and motor/generator MG2 serving as the electric generators. Each of the switching devices 74, 76 is a device capable of performing a switching function, for instance, a semiconductor element capable of serving as an inverter.

Figure 4:
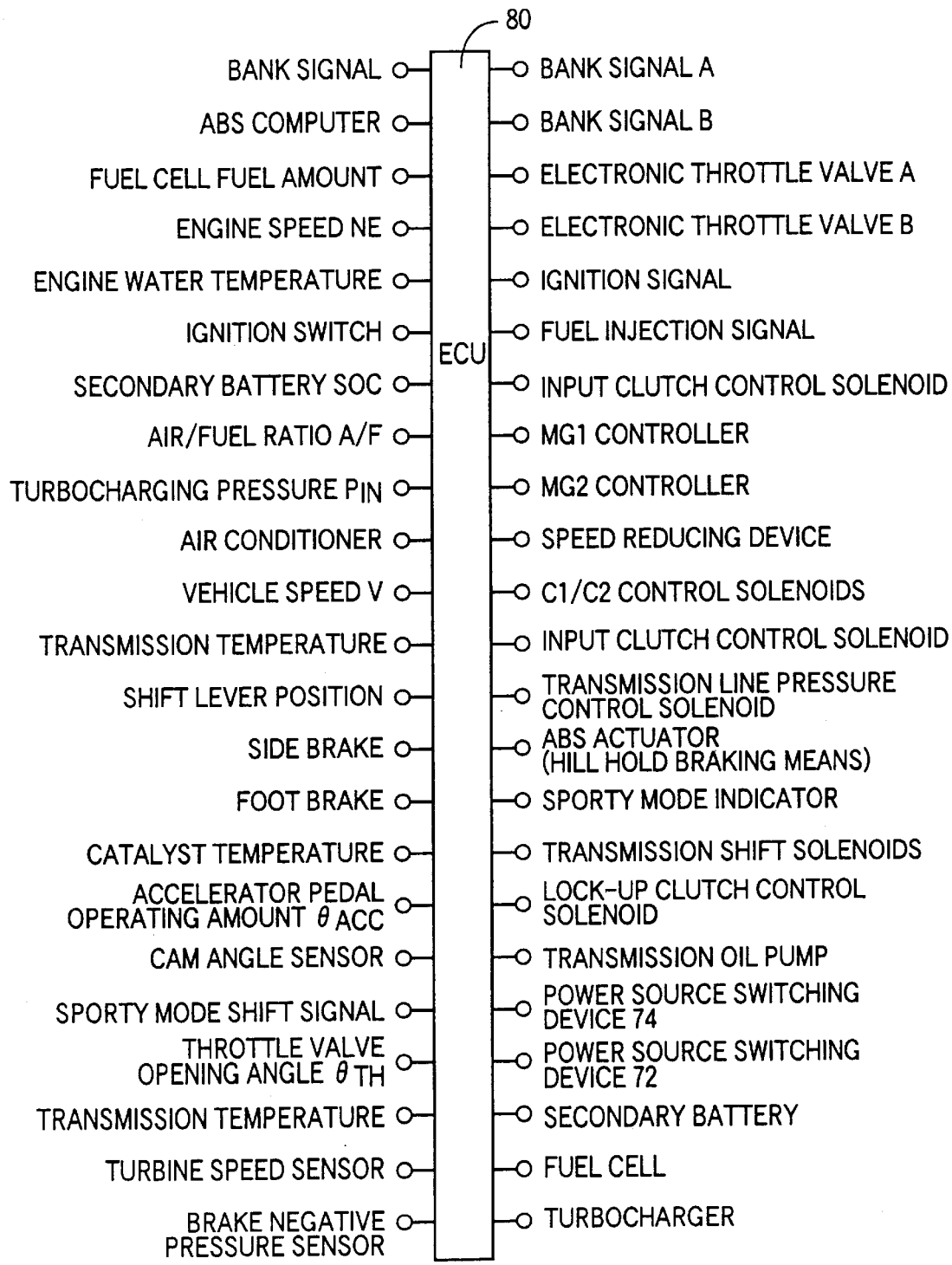
FIG. 4 is a view for explaining input and output signals of an electronic control device for the vehicle provided with the drive system of FIG. 1.

The vehicle drive system described above is controlled by an electronic control device 80 the input and output signals of which are indicated in FIG. 4. The electric control device 80 receive as its input signals the following output signals of suitable sensors (not shown): an accelerator opening signal indicative of the angle of opening $\theta_{ACC}$ of the accelerator pedal; a vehicle speed signal indicative of an operating speed $N_{OUT}$ of the output shaft 46 of the automatic transmission 16; a signal indicative of a turbocharging pressure $P_{IN}$ in the intake pipe 50; a signal indicative of the air/fuel ratio A/F of the air-fuel mixture; and a signal indicative of a presently selected one of the operating positions of a shift lever. The electronic control device 80 generates the following output signals: a fuel injection signal for controlling an amount of fuel to be injected from a fuel injector valve 100 (FIG. 6) into each cylinder of the engine 10; signals for controlling solenoid coils for driving shift control valves incorporated in the hydraulic control unit 66, to shift the automatic transmission 16 as needed; and a signal for controlling a solenoid coil for driving a lock-up clutch control valve incorporated in the hydraulic control unit 66, to control the operating state of the lock-up clutch 26.

Figure 5:
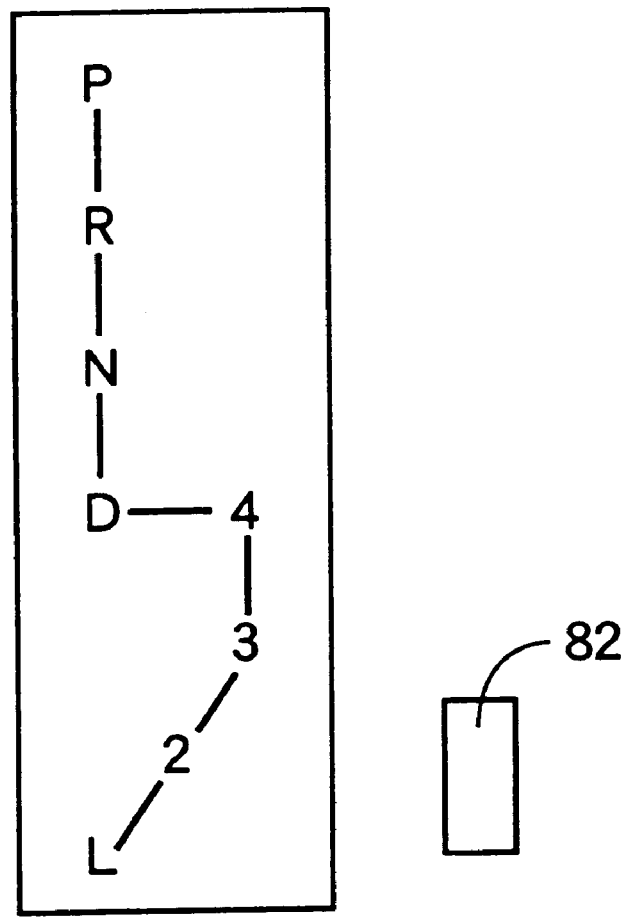
FIG. 5 is an illustration for explaining operating positions of a shift lever disposed near a console box provided in the vehicle, and a mode selector switch disposed within the console box.

Referring next to FIG. 5, there is illustrated the operating positions of the shift lever, which is disposed near a console boxy provided on the vehicle. The shift lever is shifted to select one of the eight operating positions, that is, a parking position P, a reverse drive position R, a neutral position N, a forward DRIVE position D, a $4^{th}$-speed position 4, a $3^{rd}$-speed position 3, $2^{nd}$-speed position 2 and a low-speed position L. The shift lever is movably supported by a suitable support mechanism such that the above-indicated operating positions are arranged in the longitudinal position of the vehicle, such that the DRIVE position D and the $4^{th}$-speed position 4 are located at the same longitudinal position and are spaced apart from each other in the lateral or transverse direction of the vehicle. Further, the $3^{rd}$-speed position 3 and the $2^{nd}$-speed position 2 are located such that the shift lever is moved obliquely between these positions in a direction included a suitable angle with respect to the longitudinal direction. Similarly, the $2^{nd}$-speed position and the low-speed position L are located such that the shift lever is moved obliquely between these positions in the same inclined direction. The console box incorporates a mode selector switch 82 for selecting one of an AUTOMATIC SHIFT mode and a MANUAL SHIFT mode.

Figure 7:
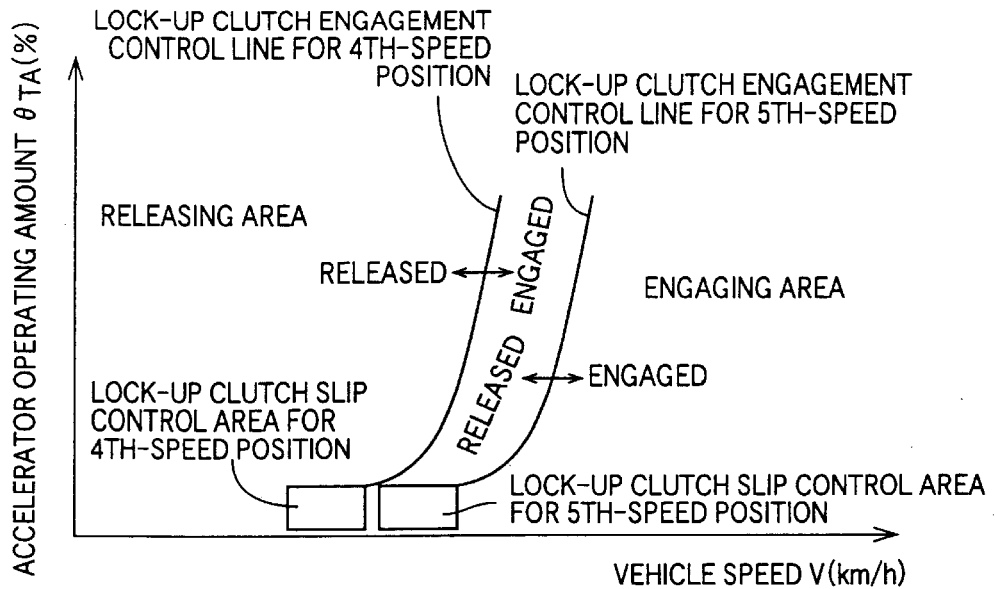
FIG. 7 is a graph showing one of two lock-up clutch control relationships which is selected by area-changing means shown in FIG. 6, when the engine is in a turbocharging lean-burn state.
Figure 8:
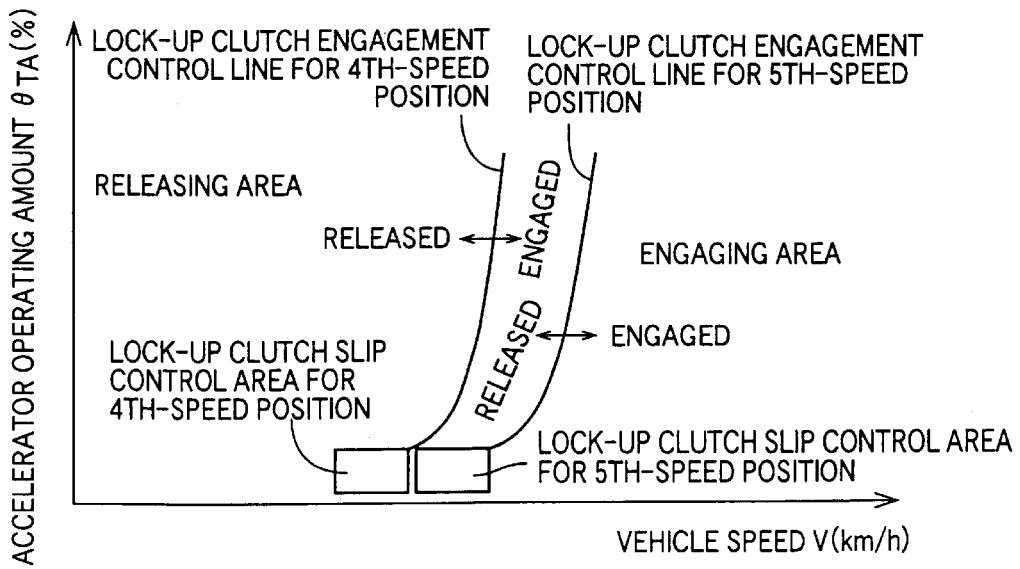
FIG. 8 is a graph showing the other lock-up clutch control relationship selected by the area-changing means when the engine is not in the turbocharging lean-burn state.

The electronic control device 80 includes a so-called microcomputer incorporating a central processing unit (CPU), a read-only memory (ROM), a random-access memory (RAM), and an input-output interface. The CPU operates to effect signal processing operations according to control programs stored in the ROM, while utilizing a temporary data storage function of the RAM, for executing various control routines such as a lock-up clutch control routine illustrated in the flow chart of FIG. 10, for controlling the lock-up clutch 26, and a transmission control routine for controlling the shifting actions of the automatic transmission 26. The lock-up clutch control routine is formulated to control the solenoid coils of the lock-up clutch control valve provided in the hydraulic control unit 66, for placing the lock-up clutch 26 in a selected one of its fully engaged, fully released and slip control states. Described in detail, the CPU of the control device 80 selects one of the engaged, released and slip control states of the lock-up clutch 26, depending upon one of an engaging area, a releasing area and a slip control area to or in which the running condition of the vehicle presently belongs or falls. The vehicle running condition is represented by an actual running speed V of the vehicle and the operating amount $\theta_{ACC}$ of the accelerator pedal. The vehicle running speed V is obtained from the speed $N_{OUT}$ of the output shaft 46 of the automatic transmission 16. For instance, one of the engaging area, releasing area and slip control area of the vehicle running condition is selected according to predetermined relationships between the vehicle running condition ($\theta_{ACC}$ and V) and the operating state (engaging, releasing and slip control areas) of the lock-up clutch 26, and on the basis of the detected vehicle running condition. Examples of the predetermined relationships are indicated in the graphs of FIGS. 7 and 8. Data maps representative of the predetermined relationships indicated above are stored in the ROM of the control device 80, more specifically, in memory means 90 which will be described. The lock-up clutch control valve is controlled to place the lock-up clutch 26 in one of its fully engaged, fully released and slip control states which corresponds to the selected one of the engaging, releasing and slip control areas.

The transmission control routine is formulated to select one of the operating positions of the automatic transmission 16, according to predetermined relationships (shift boundary lines) between the vehicle running condition ($\theta_{ACC}$ and V) and the operating positions of the automatic transmission 16, and on the basis of the detected vehicle running condition. The shift control valves provided in the hydraulic control unit 66 are controlled to shift the automatic transmission 16 to the selected operating position.

Figure 6:
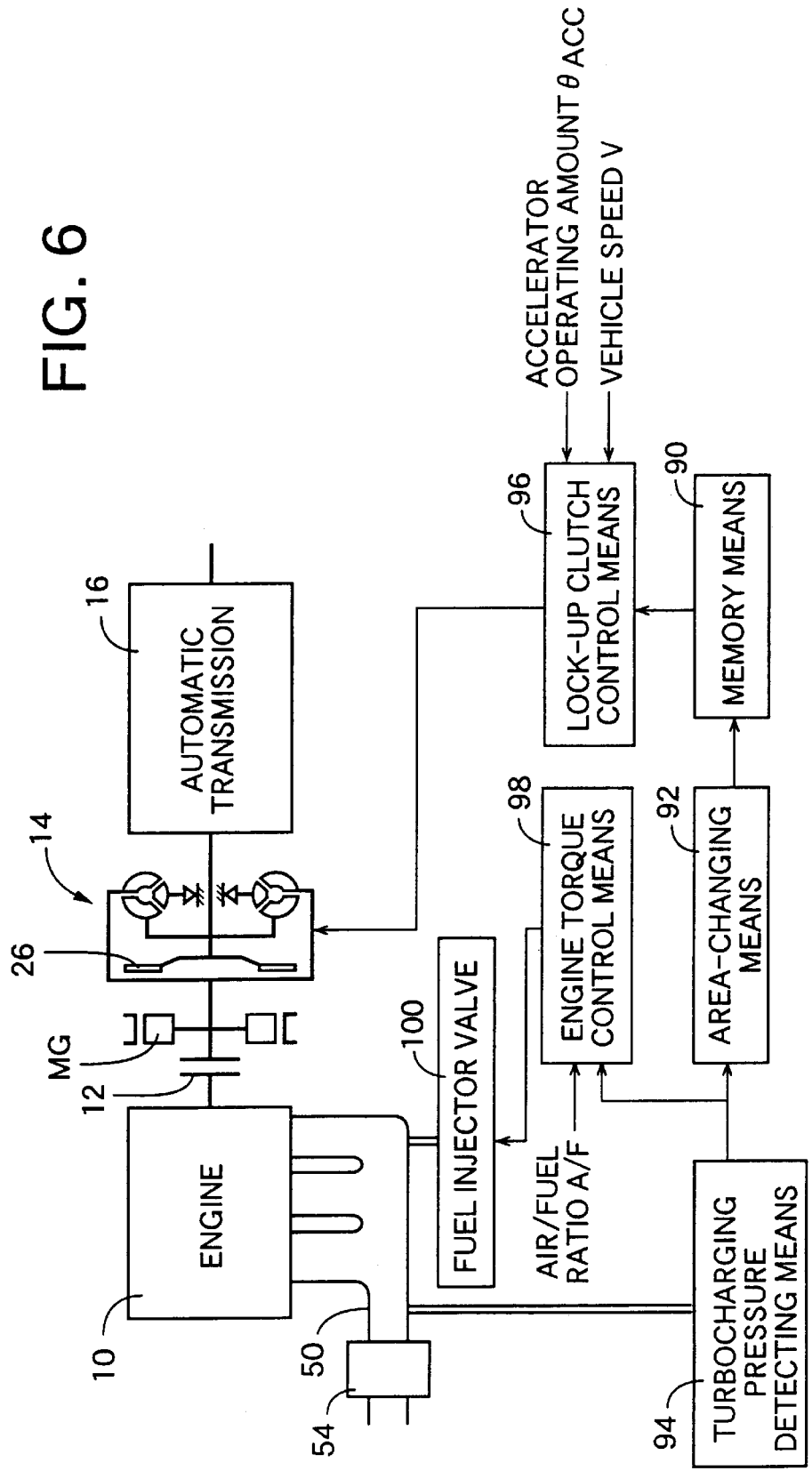
FIG. 6 is a block diagram showing major functional means of the lock-up clutch control apparatus of the electronic control device of FIG. 4.

The block diagram of FIG. 6 shows major functional means of the electronic control device 80 for controlling the lock-up clutch 26 so as to be selectively placed in one of the fully engaged, fully released and slip control states. That is, the control device 80 includes memory means 90, area-changing means 92, turbocharging pressure detecting means 94, lock-up clutch control means 96, and engine torque control means 98. As indicated above, the memory means 90 stores the data maps representative of the predetermined relationships between the vehicle running condition and the operating state (engaging, releasing and slip control areas) of the lock-up clutch 26, as indicated in the graphs of FIGS. 7 and 8. Each of these graphs indicates two lock-up clutch engagement control lines and two lock-up clutch slip control areas in a two-dimensional coordinate system wherein the vehicle running speed V is taken along the abscissa while the operating amount $\theta_{ACC}$ of the accelerator pedal is taken along the ordinate. The two lock-up clutch engagement control lines are used when the automatic transmission 16 is placed in the 4$^{th}$-speed and 4 5$^{th}$-speed positions, respectively. Similarly, the two lock-up clutch slip control areas are used in the 4$^{th}$-speed and 5$^{th}$-speed positions, respectively.

The lock-up clutch engagement control lines are generally obliquely curved such that the accelerator pedal operating amount $\theta_{ACC}$ represented by the curve increases with an increase of the vehicle running speed V. The lock-up clutch slip control areas are rectangular areas whose upper sides are connected to the lower end portions of the respective lock-up clutch engagement control lines (curves). When the vehicle running speed V at a given value of the accelerator pedal operating amount rises so as to move across the lock-up clutch engagement control lines in the right direction as seen in the graphs, the lock-up clutch 26 is controlled to initiate its engaging action. That is, the engaging area of the lock-up clutch 26 is located on the right side of each lock-up clutch engagement control line, while the releasing area is located on the left side of each lock-up clutch engagement control line. When the vehicle running condition represented by the accelerator pedal operating amount $\theta_{ACC}$ and the vehicle running speed V is located within the rectangular lock-up clutch slip control area, the lock-up clutch 26 is controlled to be placed in its slip control state.

The relationship (lock-up clutch engagement control lines and slip control areas) shown in the graph of FIG. 8 is used to control the lock-up clutch 26 while the vehicle is placed in a normal running condition. On the other hand, the relationship shown in the graph of FIG. 7 is used to control the lock-up clutch 26 while the engine 10 is operated in its turbocharging state at a relatively low speed between 1500 r.p.m. and 2500 r.p.m., for instance. In this turbocharging state in which the engine 10 is in the so-called "lean-burn" state with the intake air injected into the cylinders to provide a cooling effect, the charging efficiency of the engine 10 is improved, and the knocking tendency of the engine 10 is reduced so that the need of retarding the ignition timing to reduce the knocking tendency is reduced, whereby the reduction of the output torque of the engine 10 due to the retardation of the ignition timing is accordingly reduced. In the turbocharging state or lean-burn state of the engine 10, therefore, the stability of the combustion state of the engine 10 increases with an increase in the turbocharging pressure $P_{IN}$, and the output torque of the engine 10 increases with the turbocharging pressure $P_{IN}$. In view of this fact, the lock-up clutch engagement control lines and the lock-up clutch slip control areas shown in FIG. 7 are determined such that those control lines and slip control areas that are used while the turbocharging pressure $P_{IN}$ is relatively high are generally shifted in the left direction with respect to those shown in FIG. 8, so that a critical vehicle running speed $V_{LC}$ at which the engaging action or the slip control of the lock-up clutch 26 is initiated is lowered while the turbocharging pressure $P_{IN}$ is relatively high. Thus, the engaging area of the lock-p clutch 26 while the turbocharging pressure $P_{IN}$ is relatively high is enlarged to a maximum extent possible to permit the engine 10 to operate with a tolerable degree of vibration or surge.

The area-changing means 92 serves as engaging-area changing means for changing the engaging area of the lock-up clutch 26 depending upon the turbocharging pressure $P_{IN}$, and slip-control-area changing means for changing the slip control area of the lock-up clutch 26 depending upon the turbocharging pressure $P_{IN}$. Described more specifically, the area-changing means 92 is operated to change the engaging area of the lock-up clutch 26, by selecting one of the two relationships (data maps) of FIGS. 7 and 8 stored in the memory means 90, on the basis of the turbocharging pressure PIN in the intake pipe 50 as detected by the turbocharging pressure detecting means 94, and the detected air/fuel ratio A/F described above, so that the relationship of FIG. 7 is selected to enlarge the engaging area of the lock-up clutch 26 in the turbocharging and lean-burn state of the engine 10. For instance, the area-changing means 92 selects the relationship of FIG. 8 (hereinafter referred to as "second lock-up clutch control relationship") where the detected turbocharging pressure $P_{IN}$ in the intake pipe 50 and the detected air/fuel ratio A/F are both lower than respective predetermined threshold values, while the engine speed is in a predetermined low range, for instance, between 1500 r.p.m. and 2500 r.p.m. In this case, the lock-up clutch control means 96 uses the selected second lock-up clutch control relationship to control the lock-up clutch 26. Where the detected turbocharging pressure $P_{IN}$ is not lower than the predetermined value, that is, where the engine 10 is placed in the turbocharging lean-burn state, the area-changing means 92 selects the relationship of FIG. 7 (hereinafter referred to as "first lock-up clutch control relationship", which is therefore used by the lock-up clutch control means 96. Thus, the engaging area of the lock-up clutch 26 is changed in two steps corresponding to the first and second relationships or data maps of FIGS. 7 and 8, such that the engaging area is enlarged when the turbocharging pressure $P_{IN}$ is relatively high. In other words, the critical vehicle speed $V_{LC}$ at which the engaging action of the lock-up clutch 26 is initiated is changed in two steps depending upon whether the turbocharging pressure $P_{IN}$ is higher than the threshold value or not.

Figure 9:
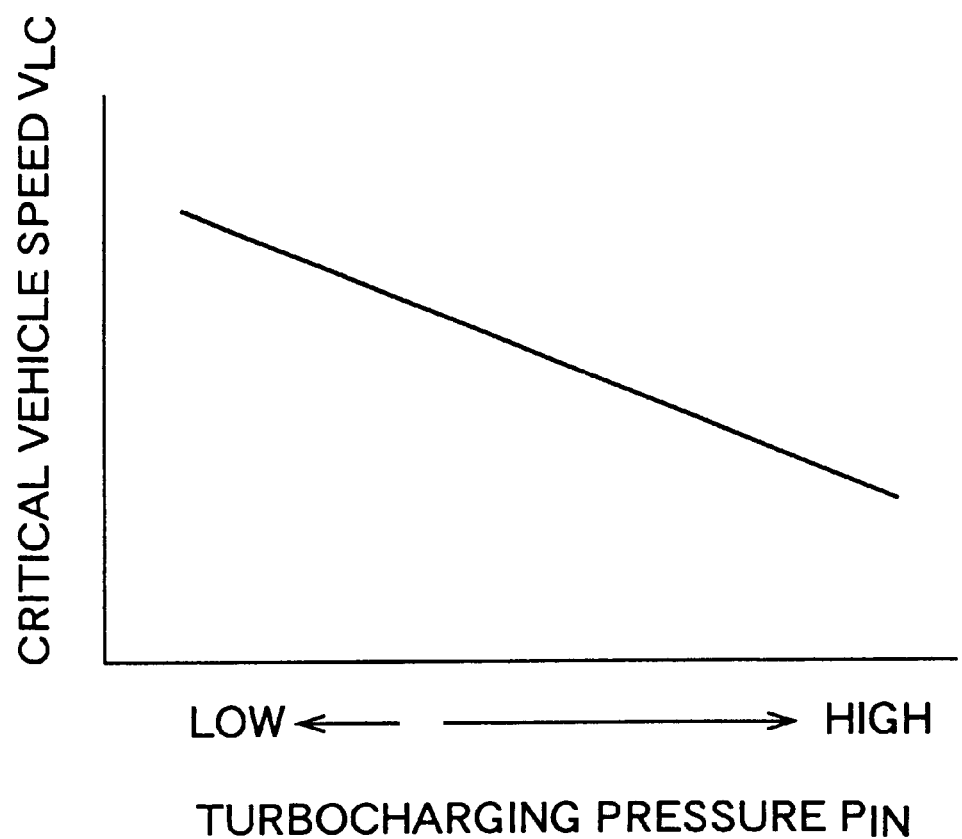
FIG. 9 is a graph indicating a change in a relationship between the turbocharging pressure and critical vehicle speed at which the lock-up clutch initiates its engaging action, which relationship is changed by the area-selecting means.

However, the memory means 90 may store data maps representative of three or more lock-up clutch relationships so that the critical vehicle speed $V_{LC}$ is changed in three or more steps, or almost continuously, with a change in the turbocharging pressure $P_{IN}$, as indicated in the graph of FIG. 9.

The lock-up clutch control means 96 is operable when the automatic transmission 16 is placed in a relatively high-speed position, in the 4$^{th}$-speed or 5$^{th}$-speed position, in this specific example. Based on the first or second lock-up clutch control relationship selected by the area-changing means 92, the lock-up clutch control means 96 selects one of the two lock-up clutch engagement control lines which corresponds to the presently selected 4$^{th}$-speed or 5$^{th}$-speed position, and one of the two slip control areas which corresponds to the selected 4$^{th}$-speed or 5$^{th}$-speed position. Further, the lock-up control means 96 to select one of the engaging area, releasing area and slip control area, on the basis of the vehicle running condition represented by the detected operating amount $\theta_{ACC}$ of the accelerator pedal and the opening angle $\theta_{TH}$ of the throttle valve 62. If a point represented by the detected value $\theta_{ACC}$ and $\theta_{TH}$ lies in the engaging area, the lock-up clutch control means 96 controls the lock-up clutch 26 to be placed or held in the fully engaged state. If the point lies in the releasing area, the lock-up clutch control means 96 controls the lock-up clutch 26 to be placed or held in the fully released state. If the point lies in the slip control area, the lock-up clutch control means 96 controls the slip ratio or slip speed of the lock-up clutch 26 so as to coincide with a predetermined target value. The lock-up clutch engagement control lines and the slip control areas are schematically indicated in the graphs of FIGS. 7 and 8, for the purpose of merely illustrating the engaging, releasing and slip control areas. Actually, these areas are determined by taking into account the hysteresis so as to deal with a variation in the operating state of the lock-up clutch 26.

The engine torque control means 98 is arranged to control the output torque of the engine 10 so as to be held at a value determined by the detected turbocharging pressure $P_{IN}$ and air/fuel ratio A/F. Where the throttle valve 62 is fully opened (with the opening angle $\theta_{TH}$ set at 100%) with an increase of the turbocharging pressure PIN while the engine speed is in the range between 1500 r.p.m. and 2500 r.p.m., the engine torque control means 98 reduces the amount of fuel to be injected from the fuel injector valves 100 into the cylinders, so that the air/fuel ratio A/F of the air-fuel mixture is increased to place the engine 10 in the lean-burn state, so as to hold the output torque constant at the predetermined value.

Figure 10:
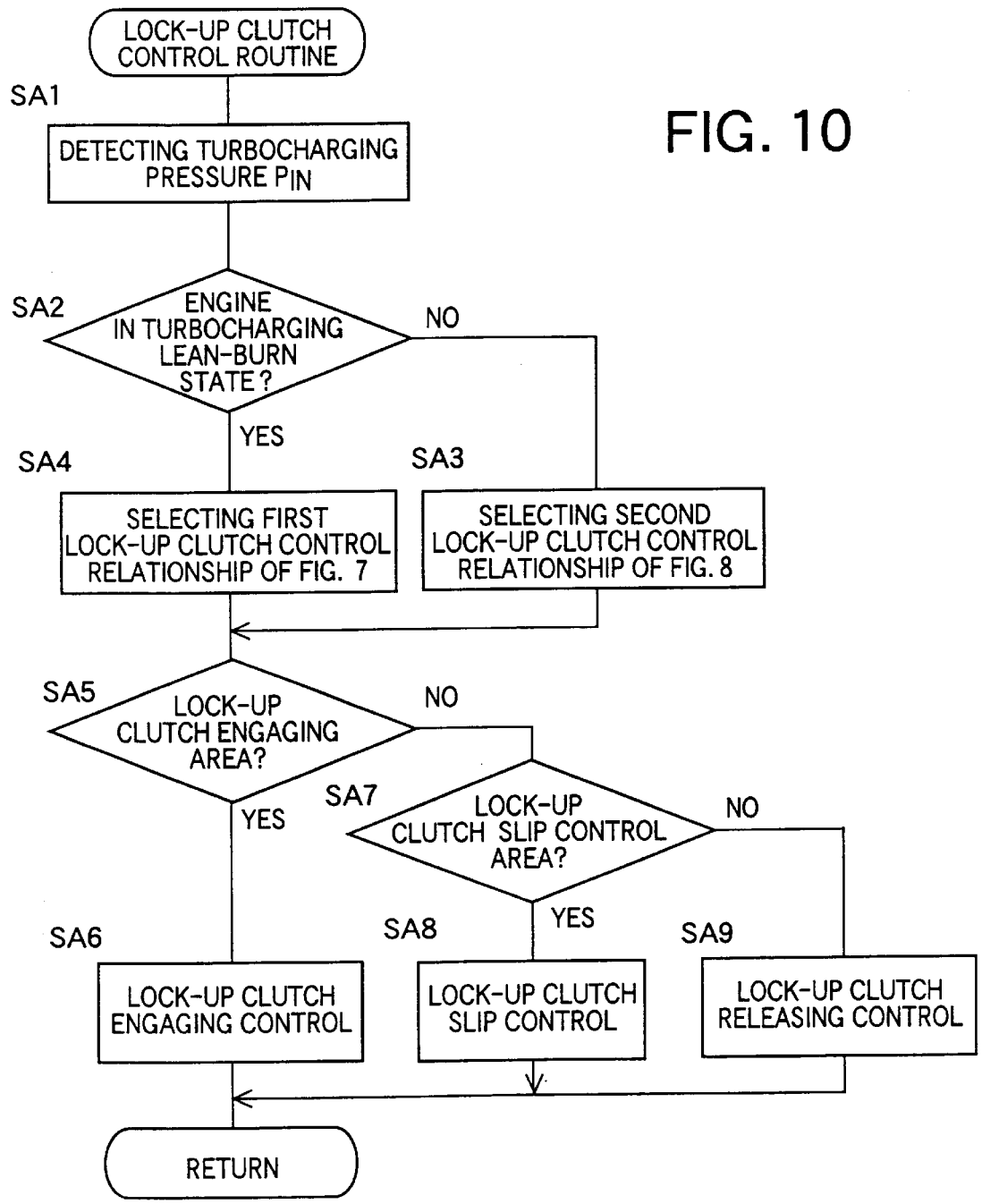
FIG. 10 is a flow chart illustrating a lock-up clutch control routine executed by the electronic control device of FIG. 6 to control the lock-up clutch.

Referring next to the flow chart of FIG. 10, there will be described the lock-up clutch control routine which is executed by the electronic control device 80 with a predetermined cycle time. This lock-up clutch control routine is initiated with SA1 corresponding to the turbocharging pressure detecting means 94, to detect the turbocharging pressure $P_{IN}$ in the intake pipe 50, on the basis of the output signal of a turbocharging pressure sensor (not shown). Step SA1 is followed by step SA2 to determine whether the engine 10 is placed in the turbocharging lean-burn state. This determination is effected on the basis of the detected turbocharging pressure $P_{IN}$ and air/fuel ratio A/F. If a negative decision (NO) is obtained in step SA2, it means that the engine 10 is in the normal operating state. In this case, the control flow goes to step SA3corresponding to the area-changing means 92, in which the second lock-up clutch control relationship of FIG. 8 stored in the memory means 90 is selected. Step SA3 is followed by steps SA5–SA9 corresponding to the lock-up clutch control means 96, so that the lock-up clutch 26 is selectively placed in one of the fully engaged, fully released and slip control states, according to the selected second lock-up control relationship of FIG. 8 and on the basis of the detected vehicle running speed V and the operating amount $\theta_{ACC}$ of the accelerator pedal. Step SA5 is provided to determine whether the point represented by the detected values V and $\theta_{ACC}$ lies in the engaging area. If an affirmative decision (YES) in step SA5, the control flow goes to step SA6 to place the lock-up clutch 26 in the fully engaged state. If a negative decision (NO) is obtained in step SA5, the control flow goes to step SA7 to determine whether the above0indicated point lies in the slip control area. If an affirmative decision (YES) is obtained in step SA7, the control flow goes to step SA8 in which the slip ratio or slip speed of the lock-up clutch 26 is controlled to be equal to a predetermined target value. If a negative decision (NO) is obtained in step SA7, the control flow goes to step SA9 to place the lock-up clutch 26 in the fully released state.

If an affirmative decision (YES) is obtained in step SA2, it means that the engine 10 is placed in the turbocharging lean-burn state. In this case, the control flow goes to step SA4 corresponding to the area-changing means 92, to select the first lock-up clutch control relationship of FIG. 7 stored in the memory means 90. Step SA4 is followed by steps SA5–SA9 in which the lock-up clutch 26 is selectively placed in one of the fully engaged, fully released and slip control states, according to the selected first lock-up clutch control relationship of FIG. 7 and on the basis of the detected value V and $\theta_{ACC}$.

It will be understood from the foregoing description of the present embodiment that the area-changing means 92 (steps SA3 and SA4) serving as the engaging-area changing means is arranged to change the engaging area of the lock-up clutch 26, on the basis of the turbocharging pressure $P_{IN}$ established by the turbocharger 54, such that the engaging area is enlarged when the engine 10 with the turbocharger 54 is placed in the turbocharging lean-burn state in which the combustion state of the engine 10 is relatively stable with the turbocharging pressure $P_{IN}$ being relatively high, so that the torque transmission efficiency of the engine 10 is improved, and the fuel economy of the engine 10 is accordingly enhanced.

It will also be understood that the area-changing means 92 (steps SA3 and SA4) serving as the engaging-area changing means is arranged to enlarge the engaging area of the lock-up clutch 26, by lowering the critical vehicle speed $V_{LC}$ when the turbocharging pressure $P_{IN}$ is higher than the predetermined threshold, that is, when the lean-burn engine 10 provided with the turbocharger 24 is placed in the turbocharging lean-burn state in which the combustion state is relatively stable with the turbocharging pressure $P_{IN}$ being relatively high, so that the torque transmission efficiency is improved to enhance the fuel economy of the engine 10.

It will further be understood that the area-changing means 92 (steps SA3 and SA4) which also serves as the slip-control-area changing means is arranged to change the slip control area of the lock-up clutch 26, on the basis of the turbocharging pressure $P_{IN}$ established by the turbocharger 54, such that the slip control of the lock-up clutch 26 is effected at a relatively low vehicle running speed while the engine 10 with the turbocharger 54 is placed in the turbocharging lean-burn state in which the combustion state of the engine 10 is relatively stable with the turbocharging pressure PIN being relatively high, so that the torque transmission efficiency of the engine 10 is improved, and the fuel economy of the engine 10 is accordingly enhanced.

It will also be understood that the area-changing means 92 (steps SA3 and SA4) serving as the slip-control-area changing means is arranged to change the slip control area of the lock-up clutch 26, such that the lowest vehicle speed V at which the slip control of the lock-up clutch 26 is effected is lowered when the engine 10 is placed in the turbocharging lean-burn state in which the combustion state is relatively stable with the turbocharging pressure $P_{IN}$ being relatively high, so that the torque transmission efficiency is improved to enhance the fuel economy of the engine 10.

It will also be understood that the engine torque control means 98 provided in the present first embodiment is arranged to hold the output torque of the lean-burn engine 10 at a predetermined constant value, on the basis of the turbocharging pressure $P_{IN}$ established by the turbocharger 54 and the air/fuel ratio A/F of the air-fuel mixture introduced into the engine 10, such that the air/fuel ratio is increased with an increase in the turbocharging pressure $P_{IN}$, so as to hold constant the output torque of the engine 10. Accordingly, the fuel economy is further improved while the engine 10 is operated under a low-speed high-load condition, that is, operated at a relatively low speed and in the turbocharging state.

While one presently preferred form of the lock-up clutch control apparatus according to the first embodiment of the present invention has been described above, for illustrative purpose only, by reference to FIGS. 1–10, the lock-up clutch control apparatus may be modified as needed.

In the illustrated first embodiment described above, the engaging area of the lock-up clutch 26 is enlarged by lowering the critical vehicle speed $V_{LC}$ when the turbocharging pressure $P_{IN}$ is higher than the predetermined threshold value. Further, the slip control area of the lock-up clutch is changed by lowering the lowest vehicle speed above which the slip control is effected, when the turbocharging pressure $P_{IN}$ is higher than the threshold value. However, the engaging area and the slip control area of the lock-up clutch 26 may be enlarged or shifted by lowering the critical operating amount of the accelerator pedal below which the lock-up clutch 26 is placed in the fully engaged state or slip control state, if this enlargement or shifting is possible with respect to the normal relationship between the vehicle running condition and the operating state of the lock-up clutch 26.

Figure 11:
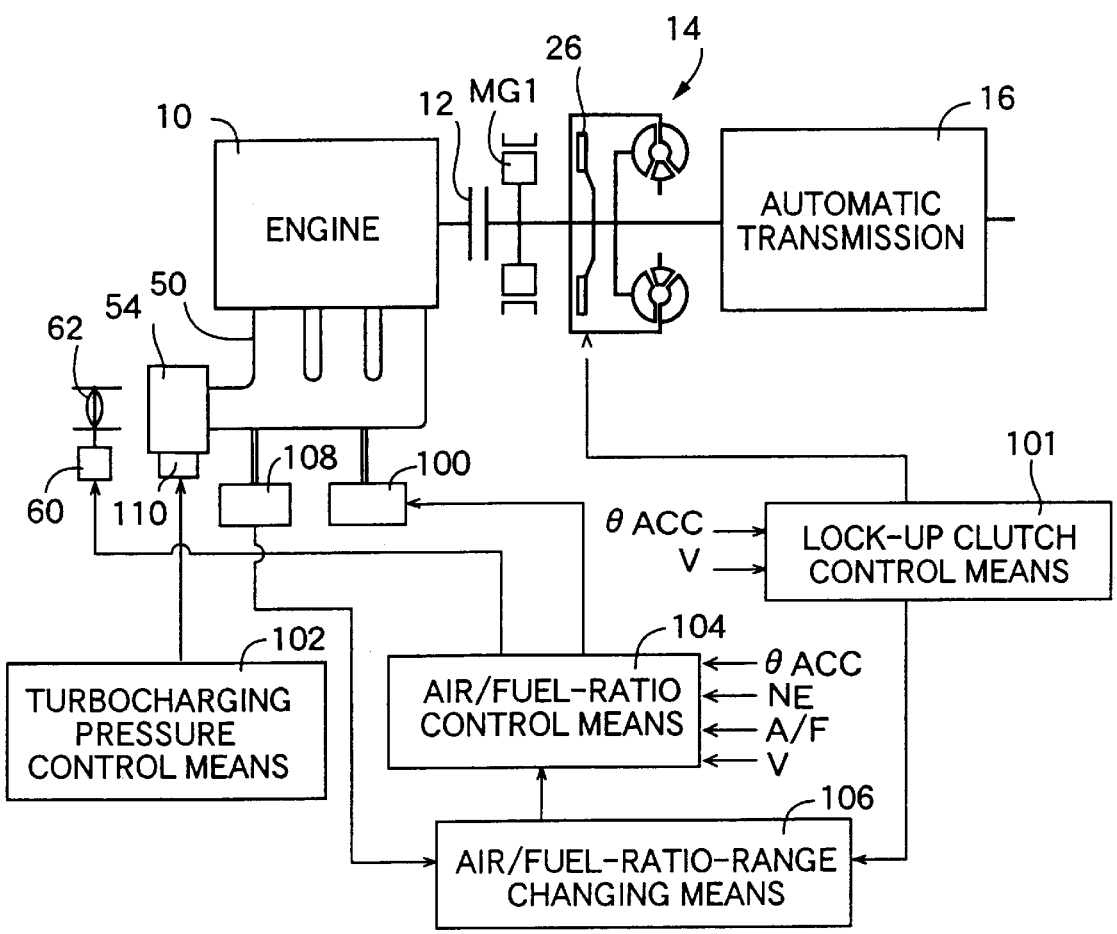
FIG. 11 is a block diagram showing major functional means of a lean-burn engine control apparatus constructed according to a second embodiment of the invention.
Figure 12:
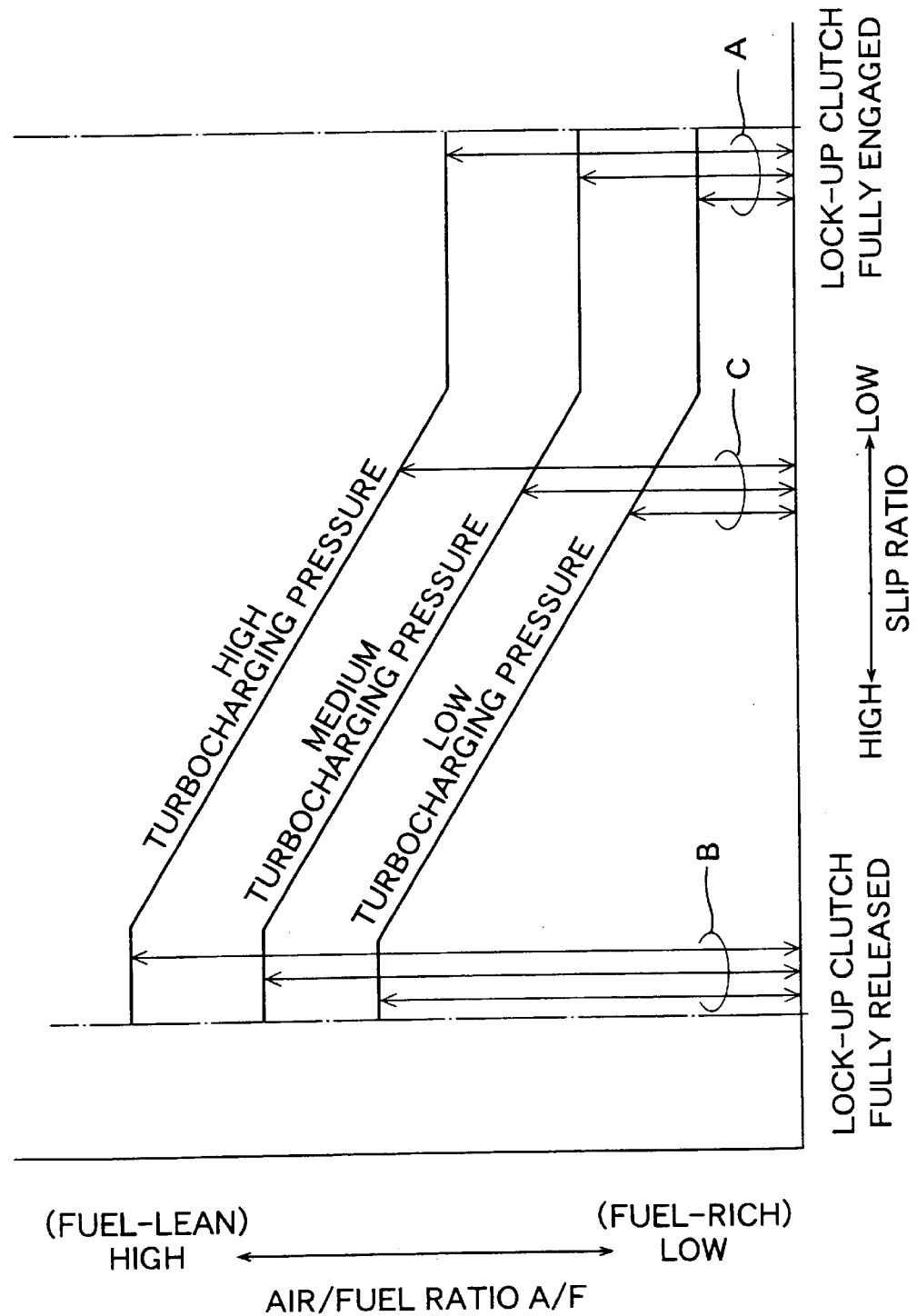
FIG. 12 is a graph indicating a predetermined relationship stored in the electronic control device, which is used by air/fuel-ratio-range changing means shown in FIG. 11.
Figure 13:
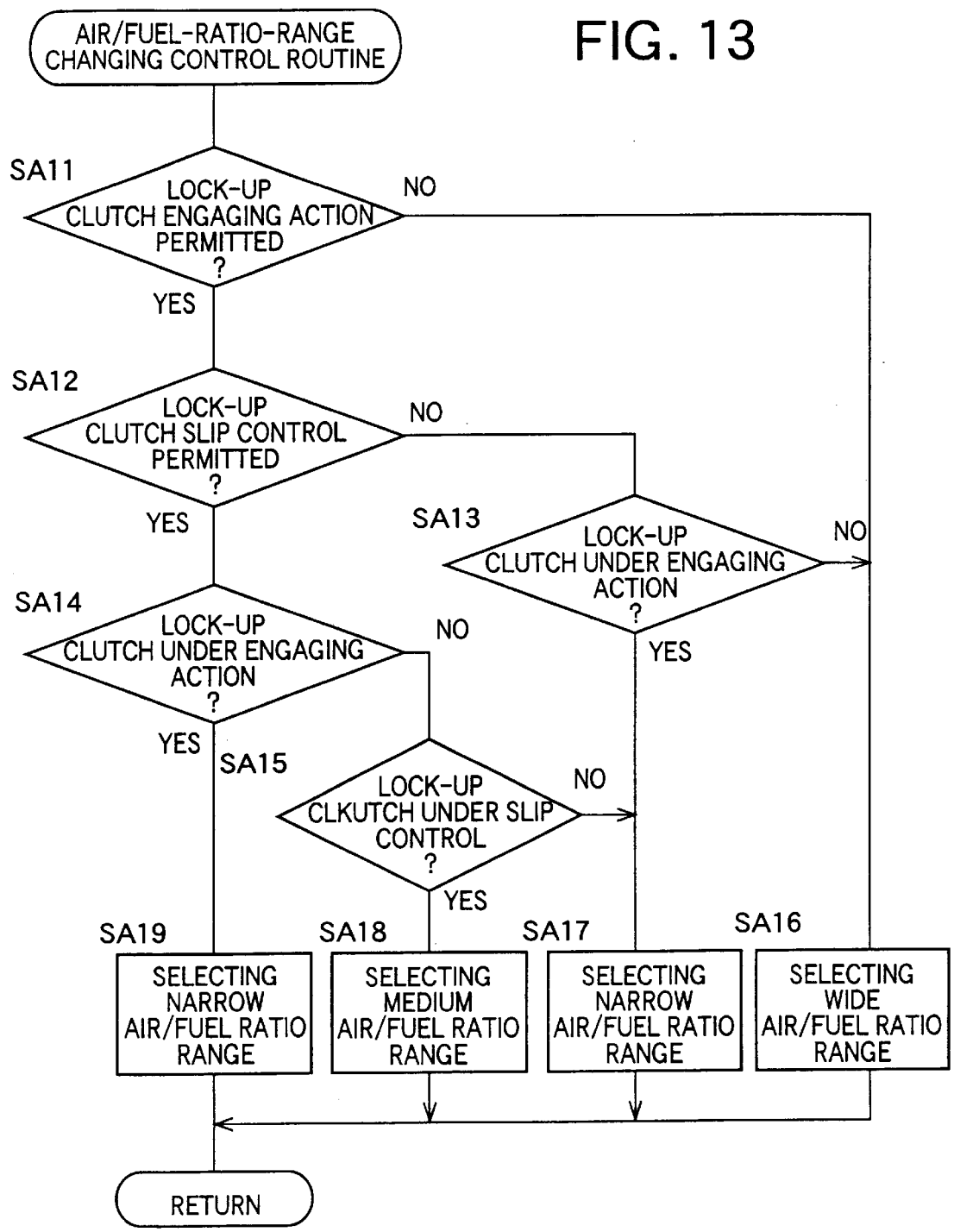
FIG. 13 is a flow chart illustrating an air/fuel-ratio-range changing control routine executed by the lean-burn engine control apparatus.

Referring next to FIGS. 11–13, there will be described a lean-burn engine control apparatus constructed according to a second embodiment of this invention to control the lean-burn engine 10 of the vehicle drive system of FIGS. 1–4. This lean-burn engine control apparatus is constituted principally an electronic control device similar to the control device 80 of FIG. 4 used in the first embodiment. However, the electronic control device used in the present embodiment includes major functional means as illustrated in the block diagram of FIG. 11. Described in detail, the control device includes lock-up clutch control means 101 operable while the automatic transmission 16 is placed in the $4^{th}$-speed or $5^{th}$-speed position. The lock-up clutch control means 101 is arranged to control the lock-up clutch 26 in a selected one of the fully engaged, fully released and slip control state, according to a lock-up clutch control relationship as indicated in the graph of FIG. 8 by way of example, and on the basis of the detected vehicle running speed V and operating amount $\theta_{ACC}$ of the accelerator pedal, as described above with respect to the first embodiment. In the present embodiment, the lock-up clutch control means 101 does not use a lock-up clutch control relationship as indicated in the graph of FIG. 7. The lock-up clutch control means 101 is arranged to control the lock-up clutch 26, so as to prevent a power loss in the torque converter 14, or so as to increase the time during which the engine 10 is controlled in a fuel-cut mode without injection of a fuel into the cylinders, while the vehicle is coasting.

The control device further includes turbocharging pressure control means 102, air/fuel-ratio control means 104, air/fuel-ratio-range changing means 106 and turbocharging pressure detecting means 108. The turbocharging pressure control means 102 is arranged to adjust the turbocharging pressure $P_{IN}$ in the intake pipe 50, by controlling a by-pass valve 110 associated with the turbocharger 54. The turbocharging pressure is adjusted for the purpose of increasing the heat efficiency (thermal efficiency) and the compression ratio of the engine 10 in its turbocharging lean-burn state, while at the same time preventing the turbocharging condition that would deteriorate the fuel economy of the engine 10 due to its knocking. Alternatively, the turbocharging pressure is increased to maximize the air/fuel ratio of the air-fuel mixture, to the extent possible to hold the surge level of the engine 10 in its turbocharging state below a predetermined upper limit.

The air/fuel-ratio control means 104 is arranged to calculate a desired output torque of the engine 10 in the turbocharging state, on the basis of the detected engine speed $N_E$ and operating amount $\theta_{ACC}$ of the accelerator pedal, for instance, such that the desired output torque can be obtained at a permissible lowest value of the air/fuel ratio of the air-fuel mixture. The air/fuel-ratio control means 104 is further arranged to a desired value of the air/fuel ratio on the basis of the calculated desired output torque of the engine 10 and the detected engine speed $N_E$. The air/fuel-ratio control means 104 is further arranged to calculate a desired intake air quantity on the basis of the detected engine speed $N_E$ and the calculated desired engine output torque and desired air/furl ratio, such that the calculated desired intake air quantity permits the engine 10 to be operated in the fuel-lean state at the desired air/fuel ratio. The air/fuel-ratio control means 104 controls the throttle actuator 60 to adjust the opening angle $\theta_{TH}$ of the throttle valve 62, so as to obtain the desired intake air quantity. The air/fuel-ratio control means 104 is further arranged to calculate a desired amount of fuel to be injected into the engine 10, on the basis of the desired intake air quantity and the desired air/fuel ratio of the air-fuel mixture, such that the calculated desired fuel amount permits the air-fuel mixture to have the desired air/fuel ratio. The air/fuel-ratio control means 104 controls fuel injector valves 108 (FIG. 11) to inject the fuel into the cylinders of the engine 10 by the calculated desired amount.

The air/fuel-ratio-range changing means 106 is arranged to change the range in which the air/fuel ratio A/F of the air-fuel mixture is variable at a given value of the turbocharging pressure $P_{IN}$. The range indicated above will be hereinafter referred to as "air/fuel ratio range". The air/fuel-ratio-range changing means 106 changes the air/fuel ratio range (used by the air-fuel-ratio control means 104), on the basis of the turbocharging pressure $P_{IN}$ detected by the turbocharging pressure detecting means 108, and the operating state (fully engaged, fully released or slipping state) of the lock-up clutch 26. Described in detail by reference to the graph of FIG. 12, the air/fuel-ratio-range changing means 106 changes the air/fuel ratio range in three steps depending upon the turbocharging pressure $P_{IN}$ such that the air/fuel ratio range is enlarged in three steps with an increase in the turbocharging pressure $P_{IN}$. Namely, a wide range of the air/fuel ratio A/F is selected when the turbocharging pressure $P_{IN}$ is relatively high, and a narrow range of the air/fuel ratio A/F is selected when the turbocharging pressure $P_{IN}$ is relatively low, while an intermediate range between the wide and narrow range is selected when the turbocharging pressure $P_{IN}$ is intermediate, as shown in FIG. 12 by way of example. The air/fuel-ratio-range changing means 106 is further arranged to change the air/fuel ratio range, depending upon the operating state of the lock-up clutch 26, such that a narrow range of the air/fuel ratio A/F is selected as indicated at A in FIG. 12 when the lock-up clutch 26 is in the fully engaged state, and a wide range of the air/fuel ratio A/F is selected as indicated at B in FIG. 12 when the lock-up clutch 26 is in the fully released state, while an intermediate range of the air/fuel ratio A/F is selected as indicated at C in FIG. 12 when the lock-up clutch 26 is in a slipping state. The air/fuel-ratio-range changing means 106 is further arranged to change the intermediate air/fuel ratio range depending upon a slip ratio $(N_P-N_T)/N_P$ of the lock-up clutch 26 in the slipping state such that the range is continuously enlarged with an increase in the slip ratio $(N_P-N_T)/N_P$. The value $N_P$ represents the rotating speed of the pump impeller 20, while the value $N_T$ represents the rotating speed of the turbine impeller 24. It is noted that the wide and intermediate ranges B, C are wider than the narrow ranges A by increasing the upper limit of the ranges B, C with respect to that of the ranges A, as the turbocharging pressure $P_{IN}$ is increased.

The air/fuel-ratio-range changing means 106, which changes the air/fuel ratio as described above, may be considered to determine the air/fuel ratio A/F depending upon the specific operating states of the engine 10 and lock-up clutch 26 such that the air/fuel ratio A/F increases with an increase in the turbocharging pressure $P_{IN}$ and with an increase in the slip ratio of the lock-up clutch 26. That is, the air/fuel-ratio-range changing means 106 may be considered to determine the air/fuel ratio A/F to be relatively low when the lock-up clutch 26 is in the fully engaged, state, relatively high when the lock-up clutch 26 is in the fully engaged state, and intermediate when the lock-up clutch 26 is in the slipping state, and further determine the air/fuel ratio A/F to increase with an increase of the slip ratio of the lock-up clutch 26. In this respect, the air/fuel-ratio-range changing means 106 may be considered to include means for changing the air/fuel ratio A/F on the basis of the turbocharging pressure $P_{IN}$ and the slip ratio of the lock-up clutch 26, or may alternatively considered to be means for changing the air/fuel ratio A/F on the basis of the operating states of the engine 10 and lock-up clutch 26.

The output torque of the engine 10 would increase with an increase of the upper limit of the turbocharging pressure $P_{IN}$ in the intake pipe 50 if the throttle valve 62 and fuel injector valves 100 were not adjusted. However, the air/fuel-ratio control means 104 described above controls the throttle actuator 60 to increase the throttle valve 62 or controls the fuel injector valves 100 to reduce the amount of fuel to be injected into the engine 10, for increasing the air/fuel ratio A/F of the air-fuel mixture by an amount corresponding to an amount of increase of the output torque of the engine 10 which would take place, so that the output torque of the engine 10 is held substantially constant.

Referring to the flow chart of FIG. 13, there will be described an air/fuel-ratio-range changing control routine executed by the electronic control device with a predetermined cycle time. This control routine is initiated with step SA11 to determine whether a predetermined condition for permitting an engaging action of the lock-up clutch 26 is satisfied. For instance, the predetermined condition is satisfied when the temperature of the working fluid of the automatic transmission 16 is higher than a predetermined upper limit, when the solenoid coil of the lock-up clutch control valve for controlling the lock-up clutch 26 is free of any defect, and when the lock-up clutch 26 is free of a juddering action. If a negative decision (NO) is obtained in step SA11, it means that the lock-up clutch 26 is in the fully released state. In this case, the control flow goes to step SA16 in which the air/fuel-ratio-range changing means 106 selects the wide air/fuel ratio range as indicated at B in the graph of FIG. 12. Namely, the upper limit of the air/fuel ratio range is set to be the highest value. In this case, the intake air quantity is adjusted by controlling the throttle actuator 60 to adjust the opening angle of the throttle valve 62.

If an affirmative decision (YES) is obtained in step SA11, the control flow goes to step SA12 to determine whether a predetermined condition for permitting a slipping action or slip control of the lock-up clutch 26 is satisfied. This condition is similar to, but is severer than the condition used in step SA11. If a negative decision (NO) is obtained in step SA12, the control flow goes to step SA13 to determine whether the lock-up clutch 26 is in the engaging action under the control of the lock-up clutch control means 101. If a negative decision (NO) is obtained in step SA13, the control flow goes to the step SA16 described above. If an affirmative decision (YES) is obtained in step SA13, the control flow goes to step SA17 to select the narrow air/fuel ratio range as indicated at A in FIG. 12, that is, to set the upper limit of the air/fuel ratio A/F to the lowest value. In this case, the intake air quantity is adjusted by controlling the throttle actuator 60 to control the opening angle of the throttle valve 62.

If an affirmative decision (YES) is obtained in step SA12, the control flow goes to step SA14 to determine whether the lock-up clutch 26 is in the engaging action under the control of the lock-up clutch control means 101. If an affirmative decision (YES) is obtained in step SA14, the control flow goes to step SA19 to select the narrow air/fuel ratio range (indicated at A in FIG. 12), as in the step SA17 described above.

If a negative decision (NO) is obtained in step SA14, the control flow goes to step SA15 to determine whether the lock-up clutch 26 is in the slipping state or slip control state under the control of the lock-up clutch control means 101. If a negative decision (NO) is obtained in step SA15, the control flow goes to step SA17 described above. If an affirmative decision (YES) is obtained in step SA15, that is, if the lock-up clutch 26 is in the slip control state, the control flow goes to step SA18 to select the intermediate air/fuel ratio range as indicated at C in FIG. 12, that is, to set the upper limit of the air/fuel ratio A/F to an intermediate value between the highest and lowest values. In this case, the intake air quantity is adjusted by controlling the throttle actuator 60 to control the opening angle of the throttle valve 62. It is also noted that the intermediate air/fuel ratio range is enlarged with an increase of the slip ratio of the lock-up clutch 26.

In the lean-burn engine control apparatus according to the present second embodiment described above, the air/fuel-ratio-range changing means 106 (steps SA11–SA19) is arranged to change the air/fuel ratio range for a given value of the turbocharging pressure $P_{IN}$ of the lean-burn engine 10, on the basis of the operating state (fully engaged, fully released or slipping state) of the lock-up clutch 26, such that the upper limit of the air/fuel ratio range is made relatively high when the lock-up clutch 26 is in the fully released state or a state near the fully released state. Accordingly, the lean-burn engine 10 provided with the turbocharger 54 can be operated in a lean-burn state with the air/fuel ratio of the air-fuel mixture being variable over a sufficiently wide range, in relation to the operating state of the lock-up clutch 26, while presenting or reducing the surge of the engine.

In the present embodiment wherein the air/fuel-ratio-range changing means 106 (steps SA11–SA19) changes the air/fuel ratio range such that the air/fuel ratio range is wider in the fully released state of the lock-up clutch 26, than in the fully engaged state, the engine 10 is less likely to suffer from a surge or vibration in the fully released state of the lock-up clutch 26, since the surge is more likely to be absorbed by the lock-up clutch 26 in the fully released state than in the fully engaged state. Accordingly, the engine 10 can be operated in a lean-burn state with a sufficiently high air/fuel ratio of the air-fuel mixture in the fully released state of the lock-up clutch 26.

The air/fuel-ratio-range changing means 106 (steps SA11–SA19) is further arranged such that each of the above-indicated narrow, wide and intermediate ranges A, B, C of the air/fuel ratio A/F is enlarged with an increase in the turbocharging pressure $P_{IN}$. This arrangement assures a high degree of stability of the combustion state of the lean-burn engine when the turbocharging pressure $P_{IN}$ is relatively high, thereby permitting significant reduction of the surge of the engine 10 during a lean-burn operation with a relatively high air/fuel ratio of the air-fuel mixture. Thus, the present lean-burn engine control apparatus assures a lean-burn operation of the engine 10 with a reduced degree of surge.

The air/fuel-ratio-range changing means 106 (steps SA11–SA19) is further arranged to change the air/fuel ratio range for a given value of the turbocharging pressure $P_{IN}$, on the basis of the slipping state of the lock-up clutch 26, such that the upper limit of the air/fuel ratio range is increased depending upon the slipping state of the lock-up clutch 26. Thus, the present arrangement permits the lean-burn engine 10 to be operated in a lean-burn state with the air/fuel ratio being variable over a sufficiently wide range, in relation to the slipping state of the lock-up clutch 26, while reducing the surge of the engine 10.

The air/fuel-ratio-range changing means 106 (steps SA11–SA19) is further arranged to enlarge the air/fuel ratio range with an increase in the slip ratio of the lock-up clutch 26. Accordingly, the engine 10 is less likely to suffer from a surge or vibration when the slip ratio of the lock-up clutch 26 is relatively high, since the surge is more likely to be absorbed by the lock-up clutch 26 when the slip ratio is relatively high, so that the engine 10 can be operated in a lean-burn state with a sufficiently high air/fuel ratio of the air-fuel mixture when the lock-up clutch 26 has a relatively high slip ratio.

While one presently preferred form of the lean-burn engine control apparatus according to the second embodiment of the present invention has been described above, for illustrative purpose only, by reference to FIGS. 11–13, the lean-burn engine control apparatus may be modified as needed.

The lock-up clutch control means 101 in the second embodiment of FIG. 11 is arranged to control the lock-up clutch 26 according to the lock-up clutch control relationship of FIG. 8. However, the lock-up clutch control means 101 may be modified to control the lock-up clutch 26 according to a selected one of the first and second lock-up clutch control relationships of FIGS. 7 and 8, as in the first embodiment of FIG. 6 wherein the lock-up clutch control apparatus includes the lock-up clutch control means 96.

Although the air/fuel-ratio-range changing means 106 is adapted to increase the upper limit of the air/fuel ratio range with an increase in the slip ratio of the lock-up clutch 26 and to maximize the upper limit when the lock-up clutch 26 is in the fully released state, the air/fuel-ratio-range changing means 106 may be modified to also change the lower limit of the air/fuel ratio range.

Figure 14:
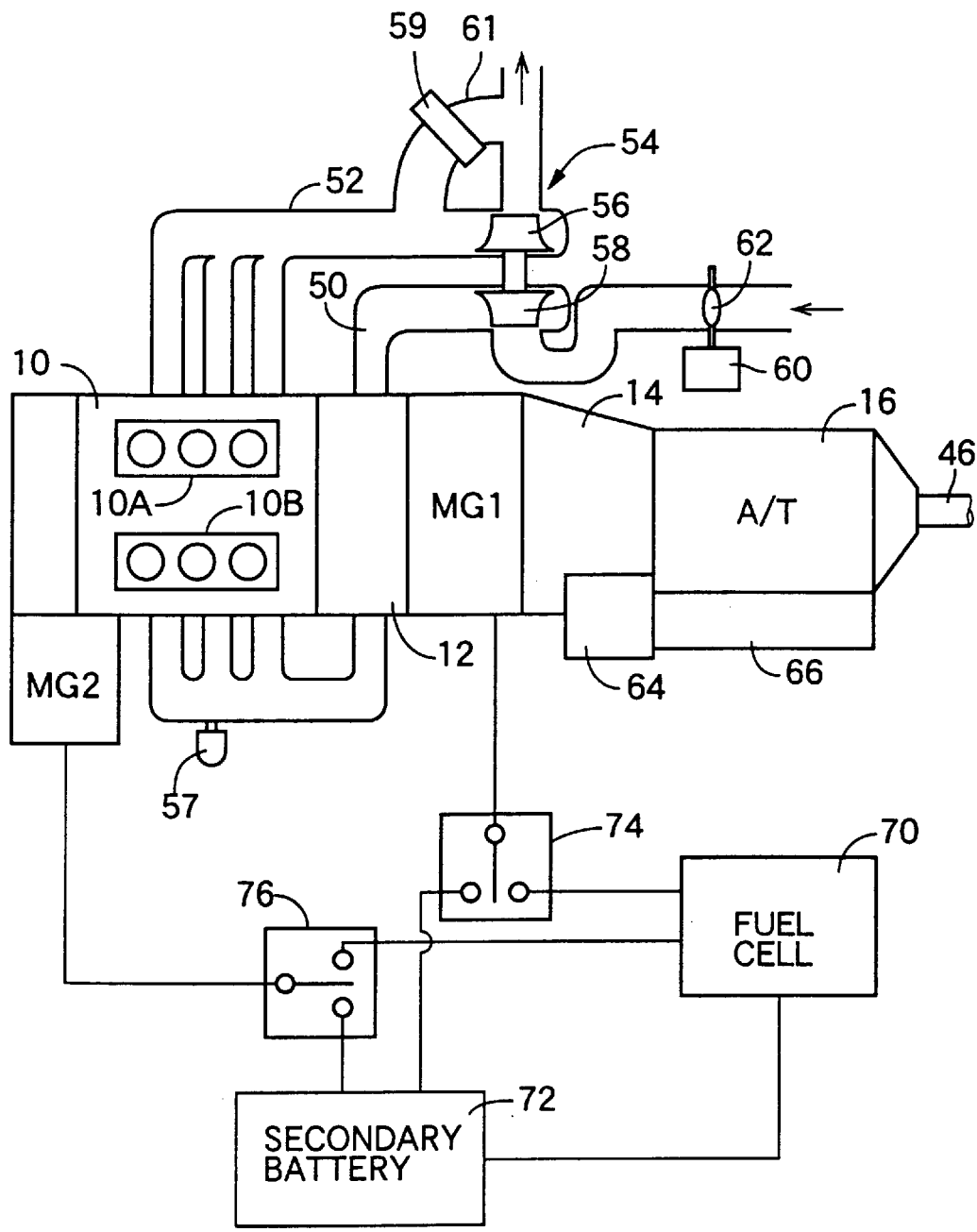
FIG. 14 is a view showing a part of a vehicle drive system which includes an engine and an automatic transmission and which is controlled by a vehicle control apparatus constructed according to a third embodiment of this invention, and which includes an engine.

Referring next to FIGS. 14–20, there will be described a vehicle control apparatus constructed according to a third embodiment of this invention. This vehicle control apparatus is applicable to an automotive vehicle whose drive system is identical to that of FIGS. 1–3, except that a pressure sensor 57 is provided to detect a turbocharging pressure Pa in the exhaust pipe 52, and an exhaust waste gate valve 59 is provided in a by-pass passage 61 connected to the exhaust pipe 52, as shown in FIG. 14. The by-pass passage 61 is disposed in parallel to a portion of the exhaust pipe 51 in which the turbine impeller 56 is disposed. The exhaust waste gate valve 59 is provided to adjust the turbocharging pressure Pa to be established in the intake pipe 50 by the turbocharger 54.

Figure 15:
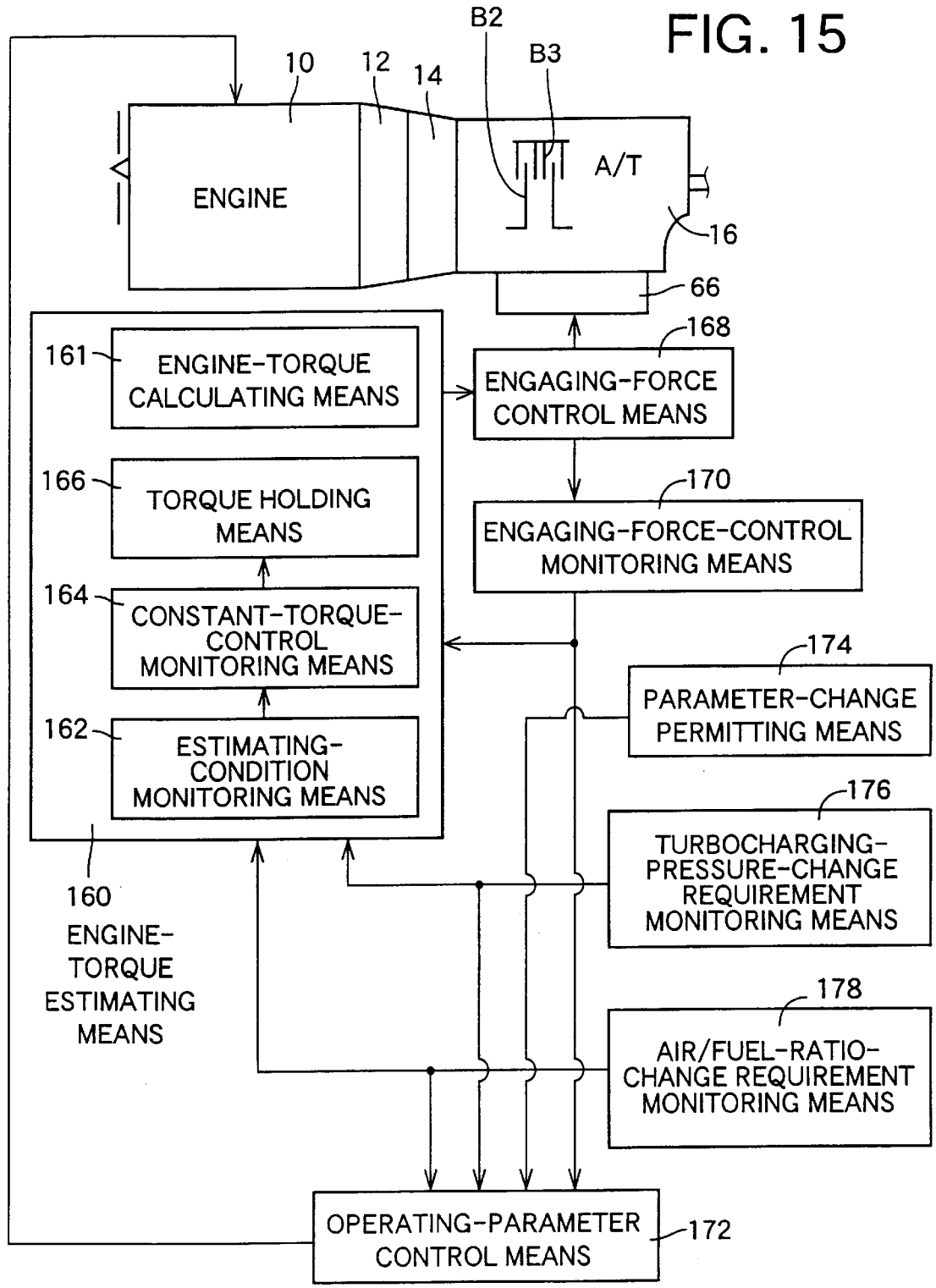
FIG. 15 is a block diagram showing major functional means of the vehicle control apparatus for controlling the vehicle drive system of FIG. 14.

The present vehicle control apparatus, which is principally constituted by the electronic control device 80 of FIG. 4, includes various functional means as shown in the block diagram of FIG. 15. The vehicle control apparatus is arranged to execute an engine-operating-parameter control routine in the form of an engine-torque-variation restricting routine illustrated in the flow chart of FIG. 19, which will be described below in detail. Briefly described, the engine-torque-variation restricting routine is formulated to restrict a variation in the output torque $T_E$ of the engine 10 and therefore a variation in the input shaft torque $T_{IN}$ of the automatic transmission 16, so as to reduce a shock to be given to the vehicle, when a change of the turbocharging pressure Pa or a change of the air/fuel ratio A/F of the air-fuel mixture is required during a shifting action of the automatic transmission 16. According to the engine-torque-variation restricting routine is arranged to restrict the variation in the engine output torque $T_E$ or the transmission input shaft torque $T_{IN}$, so as to meet the requirement for changing the turbocharging pressure Pa or air/fuel ratio A/F.

As shown in FIG. 15, the vehicle control apparatus includes engine-torque estimating means 160, which in turn includes engine-torque calculating means 161, estimating-condition monitoring means 162, constant-torque-control monitoring means 164, and torque holding means 166. The vehicle control apparatus further includes engaging-force control means 168, engine-force-control monitoring means 170, operating-parameter control means 172, parameter-change permitting means 174, turbocharging-pressure-change requirement monitoring means 176, and air/fuel-ratio-change requirement monitoring means 178. The various means 160–178 will be described in detail.

Figure 16:
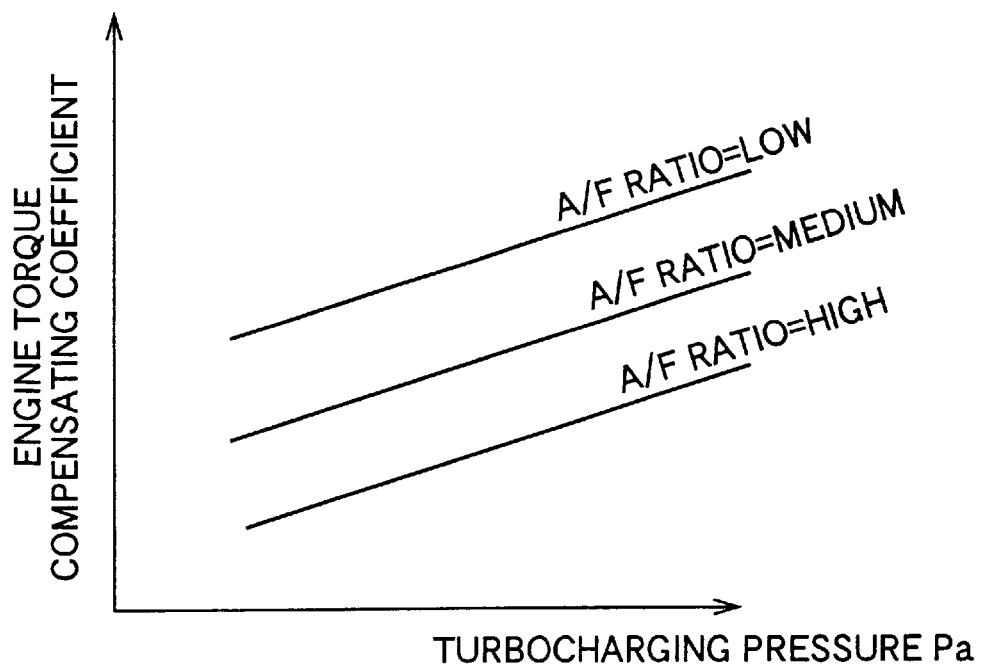
FIG. 16 is a graph indicating a predetermined relationship stored in the electronic control device, which is used by engine-torque estimating means shown in FIG. 15, to determine an engine-torque compensating coefficient used to compensate an output torque of the engine on the basis of the air/fuel ratio of the air-fuel mixture and the turbocharging pressure of the engine.

The engine-torque estimating means 160 is arranged to estimate or calculate an actual value $T_{EX}$ of the output torque T of the engine 10, according to a predetermined relationship among selected parameters, and on the basis of the actual values of these selected parameters. For instance, the parameters are selected from the group consisting of an intake air quantity QN (a quantity of the air-fuel mixture) per one revolution of the engine 10, or an intake air weight per one revolution of the engine 10: the operating speed $N_E$ of the engine 10; the turbocharging pressure Pa; an amount of retardation of ignition timing of the engine 10: a turbocharging lag of the turbocharger 54; an angle of opening of the exhaust waste gate valve 59. For instance, the engine-torque calculating means 161 of the engine-torque estimating means 160 is arranged to first obtain a basic value of the engine output torque T according to a well known relationship among the engine output torque T, engine speed $N_E$ and fuel injection amount or intake air quantity QN, and on the basis of the actual values of the engine speed and fuel injection amount of intake air quantity. The engine-torque calculating means 161 then compensates the thus obtained basic value of the engine output torque T, by using a compensating coefficient obtained according to a predetermined relationship among the compensating coefficient, the turbocharging pressure Pa and the air/fuel ratio A/F of the air-fuel mixture (or intake air quantity/amount of injection of the fuel), and on the basis of the actual values of the turbocharging pressure Pa and air/fuel ratio A/F. An example of this relationship is indicated in the graph of FIG. 16. The basic value of the engine output torque T may be further compensated, as needed, on the basis of the amount of retardation of the ignition timing of the engine 10 or the turbocharging lag of the turbocharger 54, for example. The thus compensated basic value of the engine output value T is a compensated value $T_{EY}$ of the engine output torque T. This compensated value $T_{EY}$ to be obtained by compensating the provisionally obtained basic value of the engine output torque T is a sum of the actual value $T_{EX}$ of the output torque of the engine 10 and a loss toque $T_{los}$. Since the loss torque $T_{los}$ is negligibly small, the actual engine output torque value $T_{EX}$ is almost or substantially equal to the compensated value $T_{EY}$. In this respect, the values $T_{EX}$ and $T_{EY}$ may be both referred to as estimated engine output torque. The actual engine output torque $T_{EX}$ is consumed as a torque $T_h$ for driving devices such as an air conditioner optionally provided on the vehicle. The engine-torque-estimating means 160 is also adapted to detect the operating states of such optionally provided devices, and calculate an input shaft torque $T_{IN}$ of the automatic transmission 16, which torque $T_{IN}$ is equal to $T_{EX}-T_h$.

The estimating-condition monitoring means 162 of the engine-torque estimating means 160 is arranged to determine whether a condition for initiating the estimation of the engine output torque T is satisfied. For example, this condition is satisfied when the temperature of the working fluid used in the vehicle drive system is held within a predetermined optimum range after a warm-up operation of the engine 10 is completed, and when the vehicle drive system is normally functioning without a failure of any components. The constant-torque-control monitoring means 164 is arranged to determine whether the engine 10 is in the process of a constant-torque control by the operating-parameter control means 172. In the constant-torque control, the operating parameters of the engine 10 are controlled so as to hold the input torque $T_{IN}$ of the automatic transmission 16 constant, while permitting or meeting a required change of the turbocharging pressure Pa or air/fuel ratio A/F. The toque holding means 166 is operated when the constant-torque-control monitoring means 164 has determined that the engine 10 is in the process of the constant-torque control by the operating-parameter control means 172. The torque holding means 166 determines that the input torque $T_{IN}$ of the automatic transmission 16 during the constant-torque control of the engine 10 should be held constant at the engine output torque $T_{EX}$ estimated immediately before the initiation of the constant-torque control. In response to this determination by the torque holding means 166, the operating parameter control means 172 controls the operating parameters of the engine 10 to hold the engine output torque T constant at the value $T_{EX}$ determined by the torque holding means 166, so that the input torque $T_{IN}$ of the automatic transmission 16 is held constant at the value $T_{EX}$ during the period of the constant-torque control of the engine 10. The torque holding means 166 is operated when the constant-torque-control monitoring means 164 has determined that the engine 10 is in the constant-torque control by the operating-parameter control means 172, while the estimating-condition monitoring means 162 has a determination that the condition for estimating the engine output torque T is satisfied. As a result, the engine output torque T during the constant-torque control of the engine 10 is held constant at the value $T_{EX}$ estimated just before the constant-torque control is initiated.

The engaging-force control means 168 provided in the vehicle control apparatus illustrated in the block diagram of FIG. 15 is arranged to control the hydraulic pressures to be applied to the frictional coupling devices such as the lock-up clutch 26, the shift control clutches C0–C2 and brakes B0–B4 provided in the automatic transmission 14 and a differential limiting clutch or drive-force distribution clutch (not shown) provided in the vehicle drive system, so that the engaging forces of those frictional coupling devices are suitably controlled. This engaging-force control means 168 may include, for instance, lock-up clutch control means for controlling the engaging pressure of the lock-up clutch 26, shift control means for controlling the engaging pressures of the shift control clutches and brakes C0–C2, B0–B4 of the automatic transmission 16, and clutch control means for controlling the engaging pressure of the drive-force distribution clutch provided to selectively place the vehicle system in a two-wheel drive state or a four-wheel drive state, or the engaging pressure of the differential limiting clutch.

The lock-up clutch control means of the engaging-force control means 168 may be arranged to selectively establish one of the engaged, released and slip control states of the lock-up clutch 26, depending upon one of the engaging area, releasing area and slip control area in which the present running condition of the vehicle presently falls, as described above with respect to the lock-up clutch control apparatus by reference to FIGS. 6–10. When the vehicle running condition is in the slip control area, the engaging pressure of the lock-up clutch 26 is controlled such that the actual slip speed of the lock-up clutch 26 coincides with a predetermined target value. When the vehicle running condition is in the engaging area, the engaging pressure of the lock-up clutch 26 is maximized to place the lock-up clutch 26 in the fully engaged state. The lock-up clutch control means regulates the engaging torque of the lock-up clutch 26 in the process of its engaging action or in the slip control mode, that is, the rate of rise of the engaging pressure in the engaging action of the lock-up clutch 26 or the engaging pressure in the slip control mode. This regulation of the engaging pressure of the lock-up clutch 26 by the lock-p clutch control means may be effected by adjusting the hydraulic line pressure to a suitable level on the basis of the output torque $T_{EX}$ of the engine 10 or the corresponding input torque $T_{IN}$ of the automatic transmission 16, or according to a predetermined pressure control formula such that the control gain according to the formula varies as a function of the estimated engine output torque $T_{EX}$ or a quantity which changes with this torque value $T_{EX}$.

The shift control means of the engaging-force control means 168 is arranged to effect a shift-up or shift-down action of the automatic transmission 16 depending upon whether a point defined by the detected vehicle running condition as represented by the vehicle speed and the engine load (as defined by the operating amount $\theta_{ACC}$ of the accelerator pedal), for example, has moved across a shift-up or shift-down boundary line in a rectangular coordinate system wherein the vehicle speed is taken along one of the two axes while the operating amount $\theta_{ACC}$ is taken along the other axis. The shift-up and shift-down boundary lines are provided for each set of adjacent two operating positions of the automatic transmission 16. Data representing these shift-up and shift-down boundary lines are stored in the electronic control device 80. The shift control means is further arranged to control the engaging pressures of the hydraulically operated frictional coupling devices associated with the shift-up or shift-down action in question. When the shift control means determines that the clutch-to-clutch shift-up action of the automatic transmission 16 should be effected, for instance, the engaging pressure $P_{B3}$ of the brake B3 and the engaging pressure $P_{B2}$ of the brake B2 are controlled as indicated in the time chart of FIG. 20 so that the brake B3 is gradually released to its fully released state while the brake B2 is gradually engaged to its fully engaged state, in order to shift-up the automatic transmission 16 from the $2^{nd}$-speed position to the $3^{rd}$-speed position. The shift control means controls the engaging pressures $P_{B3}$ and $P_{B2}$ and the engaging torques of the brakes B3 and B2 in the releasing and engaging actions, by controlling the hydraulic line pressure to suitable levels on the basis of the estimated engine output torque $T_{EX}$ or the corresponding input torque $T_{IN}$ of the automatic transmission 16. Alternatively, the shift control means may control the instantaneous values of the engaging pressures $P_{B3}$ and $P_{B2}$ and the rates of reduction and rise of these pressures as a function of the estimated engine output torque $T_{EX}$ or the corresponding input torque $T_{IN}$.

The clutch control means of the engaging-force control means 168 is arranged to control the engaging pressures and engaging torques of the drive-force distribution clutch and differential limiting clutch, on the basis of the detected vehicle running condition and road surface condition, so that the vehicle can be run with high stability and drivability. For instance, the clutch control means includes differential-limiting-clutch control means arranged to control the engaging pressure of the differential limiting clutch on the basis of a speed difference $\Delta N$ between front wheel speed $N_F$ and rear wheel speed $N_R$, such that the engaging pressure is reduced with an increase in the steering angle of the vehicle, and is raised when a relatively bumpy road surface or slipping of the drive wheels on the road surface is detected or when the detected difference ΔN between the front and rear wheel speeds $N_F$, $N_R$ has exceeded a predetermined threshold. The differential-limiting-clutch control means described above may be arranged to control the engaging pressure of the differential limiting clutch by controlling the hydraulic line pressure to a suitable level on the basis of the estimated output torque $T_{EX}$ of the engine 10 or the corresponding input torque $T_{IN}$ of the automatic transmission 16. Alternatively, the differential-limiting-clutch control means may be arranged to control the instantaneous value of the engaging pressure of the differential limiting clutch and the rate of change of the engaging pressure, as a function of the estimated output torque $T_{EX}$ of the engine 10 or the corresponding input torque $T_{IN}$ of the transmission 16.

The engaging-force-control monitoring means 170 of the vehicle control apparatus of FIG. 15 is arranged to determine whether the engaging-force control means 168 is in operation to control the engaging pressure of any frictional coupling devices (lock-up clutch 26, shift control clutches C0–C2 and brakes B0–B4, drive-force distribution clutch or differential limiting clutch). For instance, the engaging-force-control monitoring means 170 monitors the output signals of an electronic transmission control device, to determine whether the engaging pressure of each frictional coupling device is being controlled by the engaging-force control means 168 on the basis of the engine output torque $T_{EX}$ estimated by the engine-torque estimating means 160.

The operating-parameter control means 170 of the vehicle control apparatus of FIG. 15 is operated when the engaging-force-control monitoring means 170 determines that the engaging pressure of any frictional coupling device is being controlled by the engaging-force control means 168. The operating-parameter control means 172 is arranged to control the operating parameters of the engine 10. For instance, when a change of the turbocharging pressure Pa by the turbocharger 54 is required, the operating-parameter control means 172 controls the angle of opening of the exhaust waste gate valve 59 to control the turbocharging pressure Pa, so as to restrict the amount of change of the output torque T of the engine 10 due to a change of the turbocharging pressure Pa. When a change of the air/fuel ratio A/F of the air-fuel mixture is required, the operating-parameter control means 172 controls the fuel injector valves of the engine 10 to control the air/fuel ratio A/F, so as to restrict the amount of change of the engine output torque T due to a change of the air/fuel ratio A/F.

The operating-parameter-change permitting means 174 of the vehicle control apparatus of FIG. 15 is arranged to determine whether it is permissible to activate the operating-parameter control means 172 for controlling the operating parameters of the engine 10 such as the turbocharging pressure Pa and air/fuel ratio A/F. This determination by the operating-parameter-change permitting means 174 may be effected on the basis of the required control response of the engine 10 and the detected operating state of the engine 10 such as the state of an exhaust gas purifying catalyst. The turbocharging-pressure-change requirement monitoring means 176 is arranged to determine whether the turbocharging pressure Pa established by the turbocharger 54 is required to be raised or lowered, for some reasons other than controlling the operation of the engine 10 per se. The air/fuel-ratio-change requirement monitoring means 178 is arranged to determine whether the air/fuel ratio A/F of the air-fuel mixture is required to be increased or reduced, for some reasons other than controlling the engine 10 per se. For instance, the operating-parameter control means 172 is operated when the turbocharging-pressure-change requirement monitoring means 174 determines that the turbocharging pressure Pa is required to be lowered, while the parameter-change permitting means 174 determines that the operation of the operating-parameter control means 172 is permissible. In this instance, the operating-parameter control means 172 reduces the air/fuel ratio A/F (for increasing the ratio of the fuel content of the air-fuel mixture) to thereby increase the output torque $T_E$ of the engine 10, for compensating for a reduction of the engine output torque $T_E$ which would be caused as a result of the reduction of the turbocharging pressure Pa, so that the engine output torque $T_E$ is eventually held substantially constant. When the turbocharging-pressure-change requirement monitoring means 174 determines that the air/fuel ratio A/F is required to be reduced, while the parameter-change permitting means 174 determines that the operation of the operating-parameter control means 172 is permissible, the operating-parameter control means 172 lowers the turbocharging pressure Pa to thereby increase the output torque $T_E$ of the engine 10, for compensating for an increase of the engine output torque $T_E$ which would be caused as a result of the reduction of the air/fuel ratio A/F, so that the engine output torque $T_E$ is eventually held substantially constant.

Figure 17:
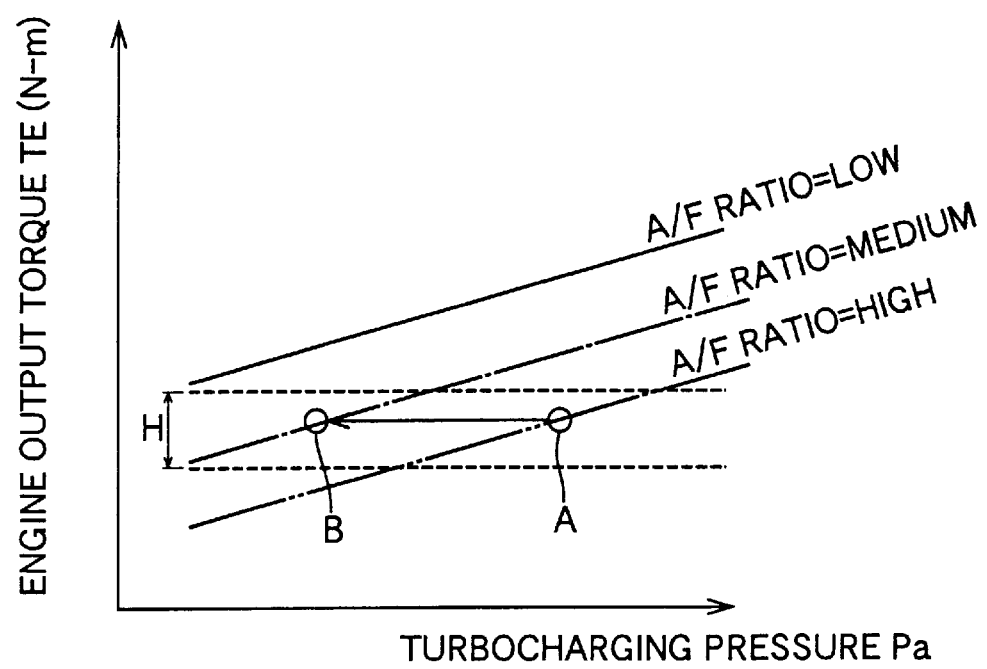
FIG. 17 is a graph for explaining a manner in which the operating parameters of the engine is controlled by the vehicle control apparatus of the third embodiment of FIG. 15.

In a turbocharging lean-burn state of the engine 10 in which a fuel-lean air-fuel mixture is burnt at the relatively high turbocharging pressure Pa in the intake pipe 50, the output torque $T_E$ of the engine 10 increases with an increase in the turbocharging pressure Pa, and with a decrease in the air/fuel ratio A/F of the air-fuel mixture, as indicated in the graph of FIG. 17.

Figure 18:
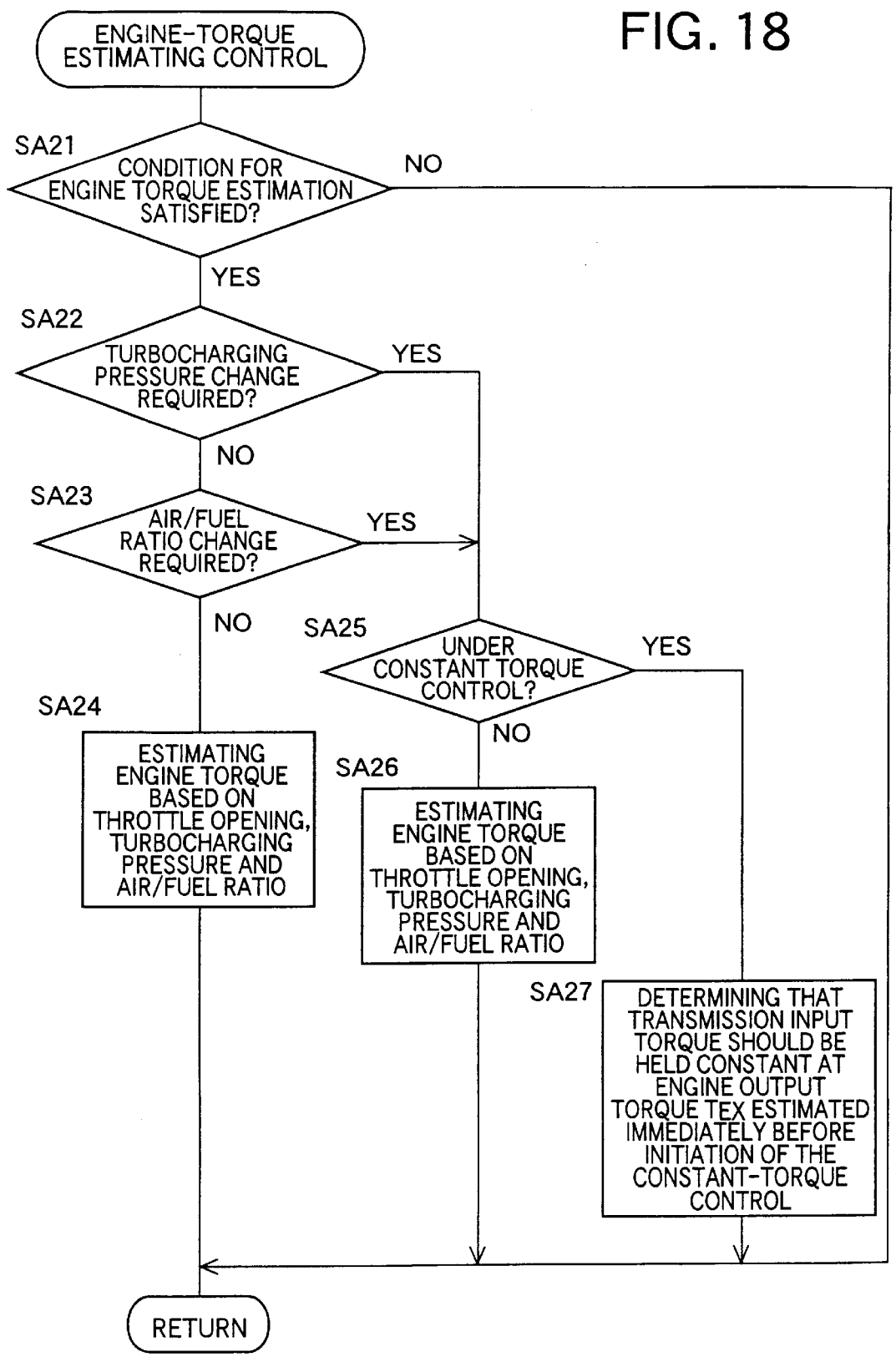
FIG. 18 is a flow chart illustrating an engine-torque estimating control routine executed by the vehicle control apparatus of FIG. 15.
Figure 19:
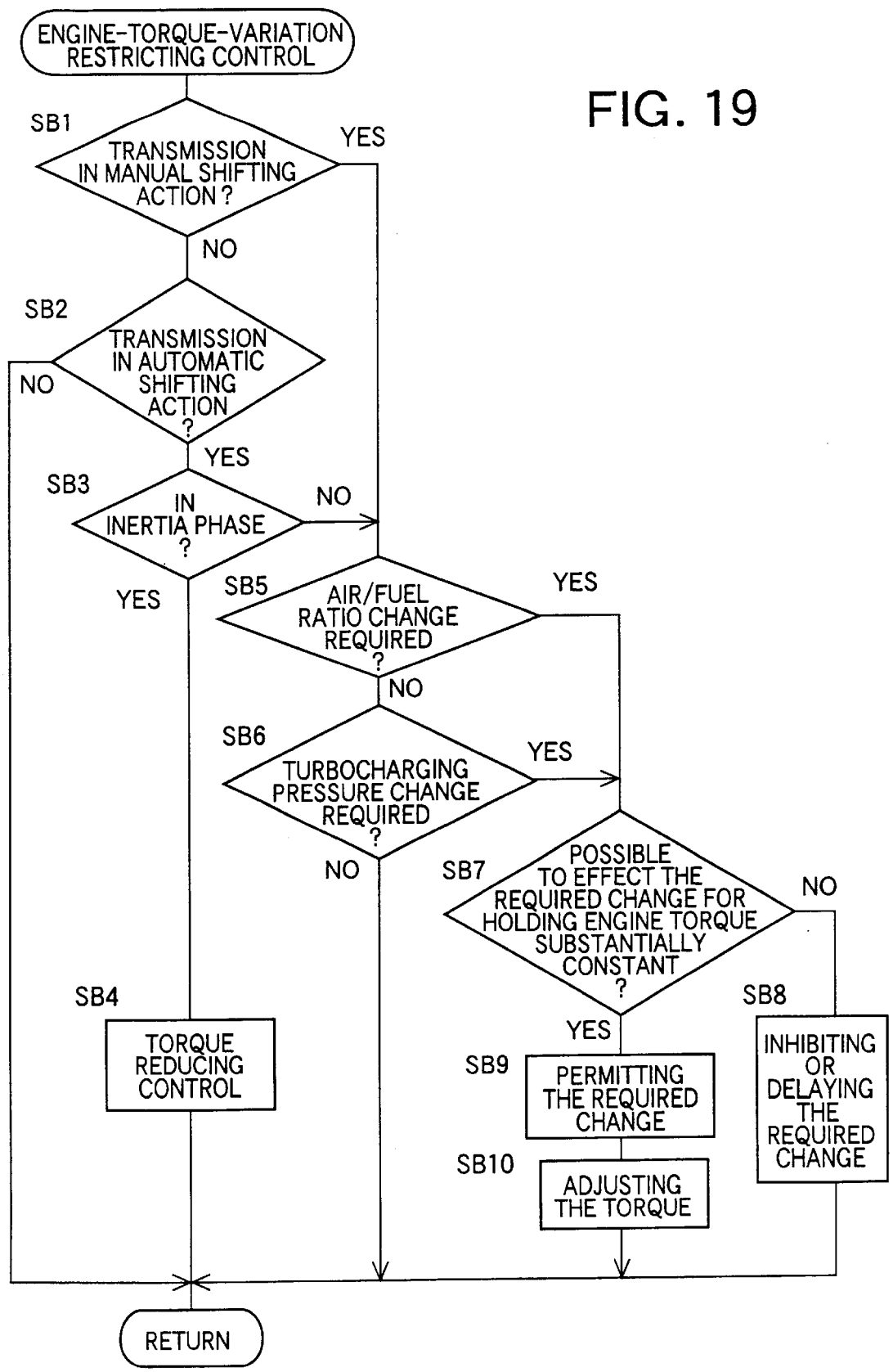
FIG. 19 is a flow chart illustrating an engine-operating-parameter control routine in the form of an engine-torque-variation restricting control routine executed by the vehicle control apparatus of FIG. 15.

The vehicle control apparatus which includes the various means 160–178 described above and which is principally constituted by the electronic control device 80 (FIG. 4) is arranged to execute an engine-torque estimating control routine illustrated in the flow chart of FIG. 18, and an engine-operating-parameter control routine in the form of an engine-torque-variation restricting control routine illustrated in the flow chart of FIG. 19. These control routines are formulated to effect the constant-torque control of the engine 10 so as to satisfying a requirement for changing the turbocharging pressure Pa or the air/fuel ratio A/F of the air-fuel mixture, while the engaging pressures of the frictional coupling devices, for instance, the engaging pressures PB2, PB3 of the shift control brakes B2, B3 are controlled to effect the 2–3 shift-up action of the automatic transmission 16, on the basis of the estimated engine output torque $T_{EX}$ of the engine 10 or the corresponding input torque $T_{IN}$ of the automatic transmission 16. The control routines of FIGS. 18 and 19 are repeatedly executed with a cycle time of several milliseconds to several tens of milliseconds. Since the operation of the engaging-force control means 168 is well known in the art, no description of this operation by reference to a flow chart is deemed necessary.

The engine-torque estimating control routine of FIG. 18 is initiated with step SA21 corresponding to the estimating-condition monitoring means 162 described above. Step SA21 is provided to determine whether the temperature of the working fluid used in the vehicle drive system is held within the predetermined optimum range after the warm-up operation of the engine 10 is completed, while the vehicle drive system is normally functioning without a failure of any components. If a negative decision (NO) is obtained in step SA21, one cycle of execution of the control routine of FIG.

18 is terminated. If an affirmative decision (YES) is obtained in step SA21, the control flow goes to step SA22 corresponding to the turbocharging-pressure-change requirement monitoring means 176, to determine whether a change of the turbocharging pressure Pa is required for some reason other than controlling the engine 10 per se. If a negative decision (NO) is obtained in step SA22, the control flow goes to step SA23 corresponding to the air/fuel-ratio-change requirement monitoring means 178, to determine whether a change of the air/fuel ratio A/F of the air-fuel mixture is required for some reason other than controlling the engine 10. If a negative decision (NO) is obtained in step SA23, the control flow goes to step SA23 corresponding to the engine-torque calculating means 161, to calculate the basic value of the engine output torque T according to a predetermined relationship among the engine output torque T, engine speed $N_E$ and fuel injection amount or intake air quantity (amount of air/fuel mixture introduced into the engine 10) QN, and on the basis of the detected engine speed NE and the intake air quantity QN. Then, the compensating coefficient for compensating the calculated basic value of the engine output torque T is calculated according to a predetermined relationship among the compensating coefficient, turbocharging pressure Pa and air/fuel ratio A/F, and on the basis of the detected actual values of the turbocharging pressure Pa and air/fuel ratio A/F. An example of the predetermined relationship to calculate the compensating coefficient is indicated in the graph of FIG. 16. The basic value of the engine output torque T is compensated by the calculated compensating coefficient, and if necessary by other parameters such as the amount of retardation of the ignition timing and the turbocharging lag of the turbocharger 54. Thus, the estimated engine output torque $T_{EY}$ is obtained. The estimated engine output torque $T_{EX}$ is equal to the estimated input torque $T_{IN}$ of the automatic transmission 16.

If an affirmative decision (YES) is obtained in any one of the steps S22, S23, the control flow goes to step SA25 corresponding to the constant-torque-control monitoring means 164, to determine whether the constant-torque control of the engine 10 has been initiated to control the operating parameters of the engine 10 during the control of the engaging pressures of the brakes B2, B3 for effecting the 2–3 shift-up action of the automatic transmission16, such that the input torque $T_{IN}$ of the automatic transmission 16 is held substantially constant, while satisfying the requirement for changing the turbocharging pressure Pa or the air/fuel ratio A/R. If a negative decision (NO) is obtained in step SA25, the control flow goes to step SA26 corresponding to the engine-torque calculating means 161, which step SA26 is similar to the step SA24 described above. Namely, step SA26 is provided to calculate the basic value of the engine output torque T according to the predetermined relationship among the engine output torque T, engine speed $N_E$ and fuel injection amount or intake air quantity (amount of air/fuel mixture introduced into the engine 10) QN, and on the basis of the detected engine speed NE and the intake air quantity QN. Then, the compensating coefficient for compensating the calculated basic value of the engine output torque T is calculated according to the predetermined relationship of FIG. 16 among the compensating coefficient, turbocharging pressure Pa and air/fuel ratio A/F, and on the basis of the detected actual values of the turbocharging pressure Pa and air/fuel ratio A/F. The basic value of the engine output torque T is compensated by the calculated compensating coefficient, and if necessary by the other parameters such as the amount of retardation of the ignition timing and the turbocharging lag of the turbocharger 54. Thus, the estimated engine output torque $T_{EY}$ is obtained. The estimated engine output torque $T_{EX}$ is equal to the estimated input torque $T_{IN}$ of the automatic transmission 16. If an affirmative decision (YES) is obtained in step SA25, the control flow goes to step SA27 corresponding to the torque-holding means 166, to determine that the input torque $T_{IN}$ of the automatic transmission 16 during the constant-torque control of the engine 10 by the operating-parameter control means 172 should be held constant at the engine output torque $T_{EX}$ estimated immediately before the initiation of the constant-torque control.

The engine-torque-variation restricting control routine of FIG. 19 is initiated with step SB1 to determine whether the automatic transmission 16 is in a manual shifting action, as a result of an operation of the shift lever from one of the operating positions to another, or as a result of an operation of a suitable manually operable member while the MODE selector switch 82 is placed in the MANUAL SHIFT mode. If a negative decision (NO) is obtained in step SB1, the control flow goes to step SB2 to determine whether the automatic transmission 16 is in an automatic shifting action, for instance, in a 2–3 shift-up action, according to the 2–3 shift-up boundary line and on the basis of the detected vehicle speed and operating amount $\theta A_{CC}$ of the accelerator pedal. If a negative decision (YES) is obtained in step SB2, one cycle of execution of the control routine of FIG. 19 is terminated. If an affirmative decision (YES) is obtained in step SB2, the control flow goes to step SB3 to determine whether the automatic transmission 16 in the shifting action is in an inertial phase. If an affirmative decision (YES) is obtained in step SB3, the control flow goes to step SB4 to effect a torque reduction control in which the output torque of the engine 10 is temporarily reduced for permitting a smooth shifting action, or to effect a feedback control of the engine 10 during the shifting action of the transmission 16.

When the transmission 16 is in a manual shifting action, that is, if an affirmative decision (YES) is obtained in step SB1, or if a negative decision (NO) is obtained in step SB3, the control flow goes to step SB5 and the subsequent steps. The steps SB1–SB3 correspond to the engaging-force-control monitoring means 10 described above, while the step SB5 corresponds to the air/fuel-ratio-change requirement monitoring means 178. The step SB5 is provided to determine whether a change of the air/fuel ratio A/F of the air-fuel mixture is required for some reason other than controlling the engine 10 per se. A typical example of this requirement to change the air/fuel ratio A/F is a requirement for effecting a so-called "rich spike" which is a temporary reduction of the air/fuel ratio A/F (a temporary increase of the fuel content of the air-fuel mixture), for the purpose of reducing the amount of NOx (nitrogen oxides) absorbed or occluded in an NOx catalyst of occlusion-reduction type disposed in the exhaust system of the lean-burn engine 10. The rich spike is effected before the occluding capacity of the NOx catalyst is saturated, that is, before the NOx catalyst has become no longer capable to absorb NOx. If a negative decision (NO) is obtained in step SB4, the control flow goes to step SB6 corresponding to the turbocharging-pressure-change requirement monitoring means 176, to determine whether the turbocharging pressure Pa is required to be changed for some reason for controlling the engine 10. If a negative decision (NO) is obtained in step SB6, one cycle of execution of the present control routine is terminated. If an affirmative decision (YES) is obtained in one of the steps SB5 and ST6, the control flow goes to step SB7 corresponding to the parameter-change permitting means 174, to determine whether it is permissible or possible to change the turbocharging pressure Pa or the air/fuel ratio A/F for the purpose of holding the output torque $T_E$ of the engine 10 or the input torque $T_{IN}$ of the automatic transmission 16. This determination in step SB 7 is made on the basis of the operating state of the engine 10, the temperature of the NOx catalyst and the required response of the engine 10. If a negative decision (NO) is obtained in step SB7, the control flow goes to step SB8 to inhibit or delay the required change of the turbocharging pressure Pa or air/fuel ratio A/F, until the control of the engaging pressures PB3, PB2 of the shift control brakes B3, B2 for the 2–3 shift-up action is completed. In the time chart of FIG. 20, the delayed rich-spike is indicated by broken line.

Figure 20:
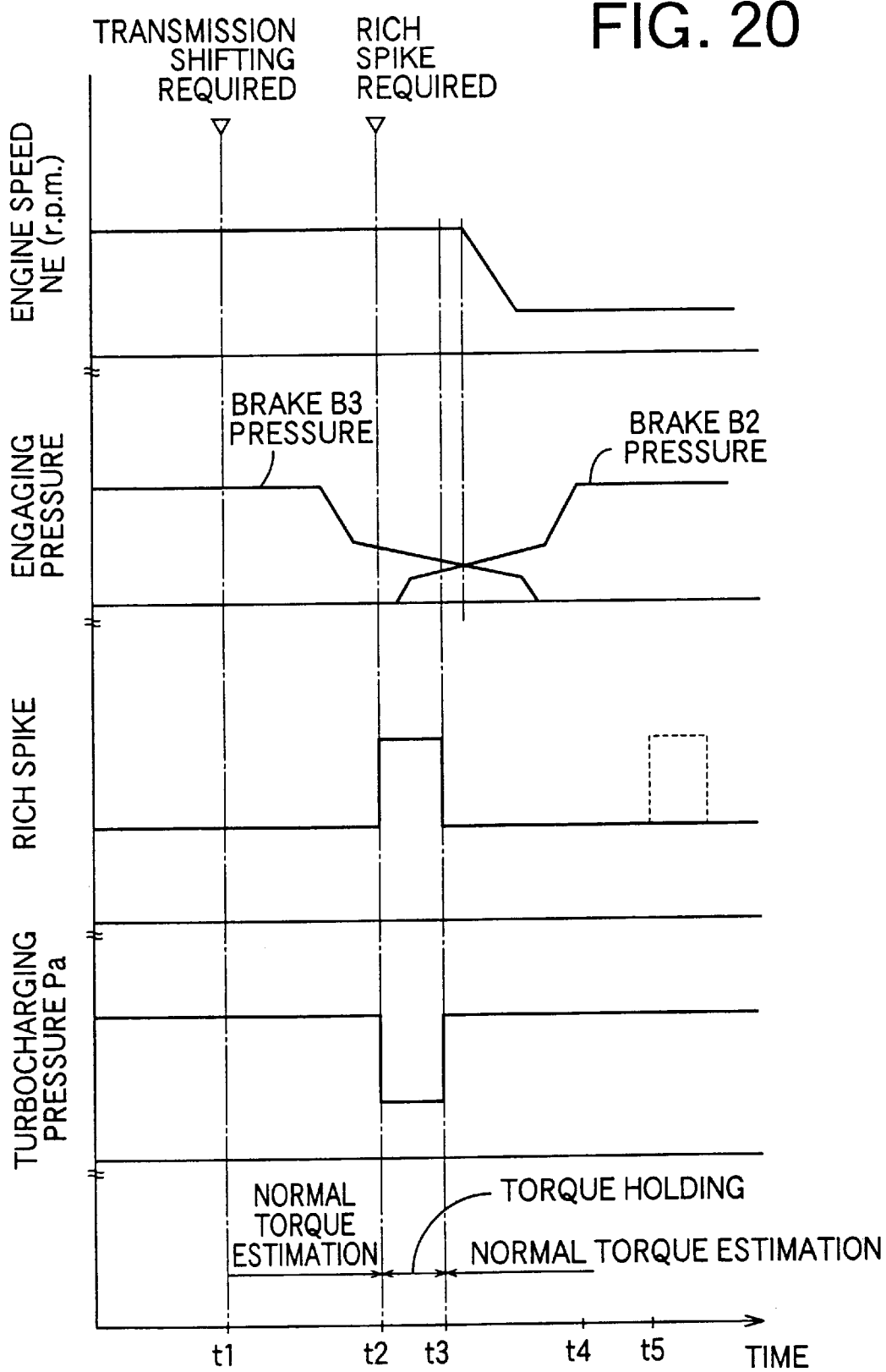
FIG. 20 is a time chart for explaining changes of various parameters of the engine when the engine is controlled according to the engine-torque-variation restricting routine of FIG. 19.

If an affirmative decision (YES) is obtained in step SB7, the control flow goes to step SB9 to permit the required change of the turbocharging pressure Pa or air/fuel ratio A/F, for instance, the required reduction of the air/fuel ratio A/F for effecting the so-called "rich spike", as indicated by solid line in the time chart of FIG. 20. Step SB9 is followed by step SB10 corresponding to the operating-parameter control means 172, in which the engine 10 is controlled so that its output torque is held substantially constant, irrespective of a variation of the engine output torque which would take place due to the required change of the turbocharging pressure Pa or air/fuel ratio A/F, which has been permitted in step SB9. In the example of FIG. 20, the rich spike is effected during a time period between points of time t2 and t3, for temporarily reducing the air/fuel ratio A/F for increasing the fuel content of the air-fuel mixture. In this case, the turbocharging pressure Pa is temporarily lowered in order to offset or compensate for an amount of increase of the engine output torque which would be caused as a result of the rich spike, so that the output torque of the engine 10 is eventually held substantially constant.

In the vehicle control apparatus according to the present third embodiment of the invention, the engaging-force-control monitoring means 170 (steps SB1–SB3) determines whether the engaging pressures of the hydraulically operated frictional coupling devices (brakes B2 and B3) are being controlled by the engaging-force control means 168. If the turbocharging pressure Pa established by the turbocharger 54 is changed according to a command requiring this change while the affirmative decision is obtained by the engaging-force-control monitoring means 170, the operating-parameter control means 172 (step SB10) controls the operating parameter (i.e., air/fuel ratio A/F of the air-fuel mixture) of the engine 10, so as to restrict a variation of the engine output torque which would take place as a result of the change of the turbocharging pressure Pa by the turbocharger 54. Accordingly, the requirement for changing the turbocharging pressure Pa can be met while avoiding a shock upon changing of the turbocharging pressure Pa during the control of the engaging pressures of the frictional coupling devices (brakes B2, B3 by the engaging-force control means 168 for shifting up the automatic transmission 16 from the $2^{nd}$-speed position to the $3^{rd}$-speed position).

The present third embodiment is further arranged such that if the air/fuel ratio A/F is changed according to a command requiring this change while the affirmative decision is obtained by the engaging-force-control monitoring means 170 (steps SB1–SB3), the operating-parameter control means 172 (step SB10) controls the operating parameter (i.e., turbocharging pressure Pa) of the engine 10, so as to restrict a variation of the engine output torque which would take place as a result of the change of the air/fuel ratio A/F. Accordingly, the requirement for changing the air/fuel ratio A/F can be met while avoiding a shock upon changing of the air/fuel ratio A/F during the control of the engaging pressures of the frictional coupling devices (brakes B2, B3 by the engaging-force control means 168 for the 2–3 shift-up action of the automatic transmission 16.

In the present vehicle control apparatus, the engine-torque estimating means 160 (steps SA4, SA6) is arranged to normally estimate the output torque $T_E$ of the engine 10 on the basis of the intake air quantity QN (per one revolution) and speed NE of the engine 10, the turbocharging pressure Pa established by the turbocharger 54, and the amount of fuel injected into the engine 10. Accordingly, the estimated engine output torque $T_{EX}$ can be obtained with high accuracy, so that the shock to be given to the vehicle during a shifting action of the automatic transmission 16 can be significantly reduced. For obtaining the estimated engine output torque $T_{EX}$, the engine-torque estimating means 160 first obtains the basic value of the engine output torque on the basis of the intake air quantity QN per one revolution of the engine 10 and the engine speed $N_E$, and then compensates the thus obtained basic engine output torque value by using the compensating coefficient, which is calculated according to the predetermined relationship of FIG. 16 and on the basis of the detected actual air/fuel ratio A/F (ratio of the intake air quantity to the injected fuel amount) and the actual turbocharging pressure Pa detected by the pressure sensor 57. If necessary, the engine-torque estimating means 160 compensates the estimated engine output torque TEX on the basis of the amount of retardation of the ignition timing, the turbocharging lag and the angle of opening of the exhaust waste gate valve 59, so that the accuracy of estimation of the engine output torque can be further improved.

The engine-torque estimating means 160 (step SA7) of the present vehicle control apparatus is further arranged to use the engine output torque estimated immediately before the initiation of the constant-torque control of the engine 10 by the operating-parameter control means 172, so that the actual engine output torque is held constant at that estimated engine output torque during the constant-torque control of the engine. Namely, the engine output torque is not estimated during the constant-torque control of the engine 10 in which the engine output torque if estimated would more or less vary. This arrangement permits a higher degree of stability in the constant-torque control of the engine 10, without using the engine output torque estimated during the constant-torque control. Further, the present embodiment results in a reduced load on the engine-torque estimating means 160.

The automatic transmission 16 of planetary gear type having a plurality of operating positions uses the hydraulically operated frictional coupling devices in the form of the brakes B3 and B2 which are respectively released and engaged to effect the clutch-to-clutch shift-up action from the $2^{nd}$-speed position to the $3^{rd}$-speed position. The control of the engine 10 according to the present embodiment upon changing the turbocharging pressure Pa or air/fuel ratio A/F of the air-fuel mixture during the 2–3 shift-up action of the automatic transmission 16 permits the 2–3 shift-up action while effectively minimizing a shock to be caused by the shift-up action and the change of the turbocharging pressure Pa or air/fuel ratio A/F.

The operating-parameter control means 172 (step SB10) of the present vehicle control apparatus is arranged to hold the engine output torque substantially constant irrespective of a reduction of the air/fuel ratio A/F, by lowering the turbocharging pressure, and/or retarding the ignition timing and/or reducing the angle of opening of the throttle valve 62, in order to offset an increase of the engine output torque which would be caused by the reduction of the air/fuel ratio A/F. Further, the operating-parameter control means 172 is arranged to hold the engine output torque substantially constant irrespective of an increase of the air/fuel ratio A/F, by raising the turbocharging pressure and/or advancing the ignition timing and/or increasing the angle of opening of the throttle valve 62, in order to offset a reduction of the engine output torque which would be caused by the increase of the air/fuel ratio A/F. The operating-parameter control means 172 is further arranged to hold the engine output torque substantially constant irrespective of an increase of the turbocharging pressure Pa, by increasing the air/fuel ratio A/F, and/or retarding the ignition timing and/or reducing the angle of opening of the throttle valve 62, in order to offset an increase of the engine output torque which would be caused by the increase of the turbocharging pressure Pa. Further, the operating-parameter control means 172 is arranged to hold the engine output torque substantially constant irrespective of a reduction of the turbocharging pressure Pa, by reducing the air/fuel ratio A/F and/or advancing the ignition timing and/or increasing the angle of opening of the throttle valve 62, in order to offset a reduction of the engine output torque which would be caused by the reduction of the turbocharging pressure Pa.

The engaging-force-control monitoring means 170 of the present vehicle control apparatus is arranged to determine whether the engaging pressures of the hydraulically operated frictional coupling devices are being controlled by the engaging-force control means 168 on the basis of the output torque $T_{EX}$ of the engine 10 as estimated by the engine-torque estimating means 160. The parameter-change permitting means 174 is arranged to delay the required change of the operating parameter of the engine 10 until the control of the engaging pressures of the frictional coupling device to effect the shifting action of the automatic transmission 16 is completed, if the required change cannot be effected so as to hold the engine output torque substantially constant. This arrangement of the parameter-change permitting means 174 is effective to prevent adverse influences of the change of the operating parameter on the operating state of the engine 10, the temperature of the catalyst and the control response.

While the vehicle control apparatus according to the third embodiment is adapted to execute the engine-torque estimating control routine of FIG. 18 and the engine-torque-variation restricting routine of FIG. 19, these control routines may be modified as needed.

The vehicle control apparatus according to the third embodiment may be modified to be applicable to a vehicle drive system wherein a continuously variable transmission of belt-and-pulley type including a pair of variable-diameter pulleys and a belt connecting the pulleys is used in place of the automatic transmission 16 of planetary gear type.

While the engine-torque calculating means 161 according to the third embodiment is arranged to first obtain the basic value of the output engine torque according to the predetermined relationship and on the basis of the detected engine speed $N_E$ and angle of opening θ of the throttle valve (intake air quantity), and then obtains the estimated engine output torque $T_{EX}$ by compensating the initially obtained basic value according to the predetermined relationship of FIG. 16 and on the basis of the detected turbocharging pressure Pa and air/fuel ratio A/F. However, the engine-torque calculating means 161 may be arranged to calculate the estimated engine output torque $T_{EX}$ according to a single predetermined relationship and on the basis of the actual values of the engine speed $N_E$, throttle valve opening angle θ, turbocharging pressure Pa and air/fuel ratio A/F.

Although the engaging-force control means 168 is arranged to control the engaging forces of the hydraulically operated frictional coupling devices such as the brakes B2, B3, the engaging-force control means 168 is applicable to electromagnetically operated frictional coupling devices such as electromagnetic powder clutches.

Figure 21:
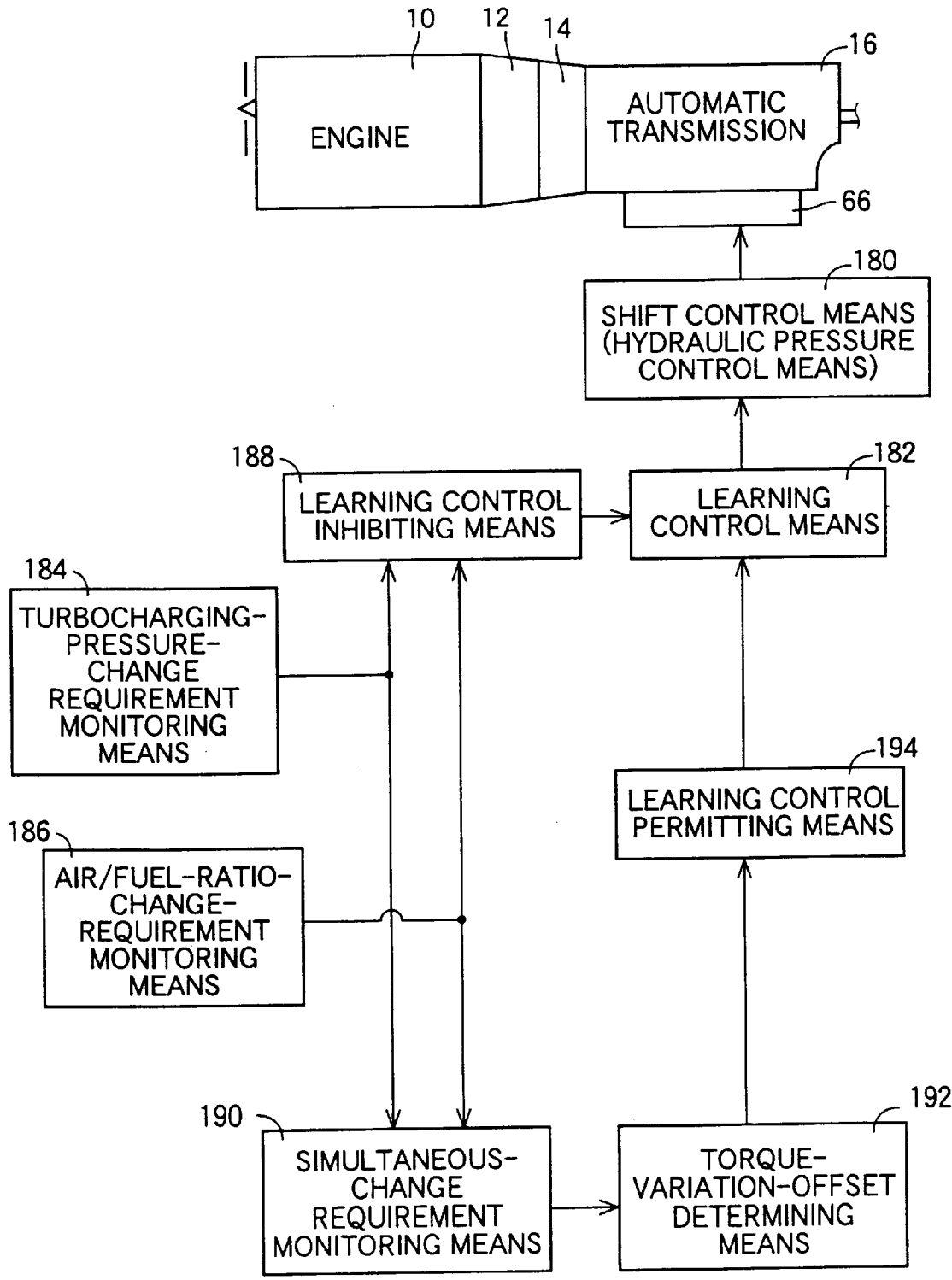
FIG. 21 is a block diagram showing major functional means of a vehicle control apparatus constructed according to a fourth embodiment of this invention for controlling the vehicle drive system of FIG. 14.
Figure 22:
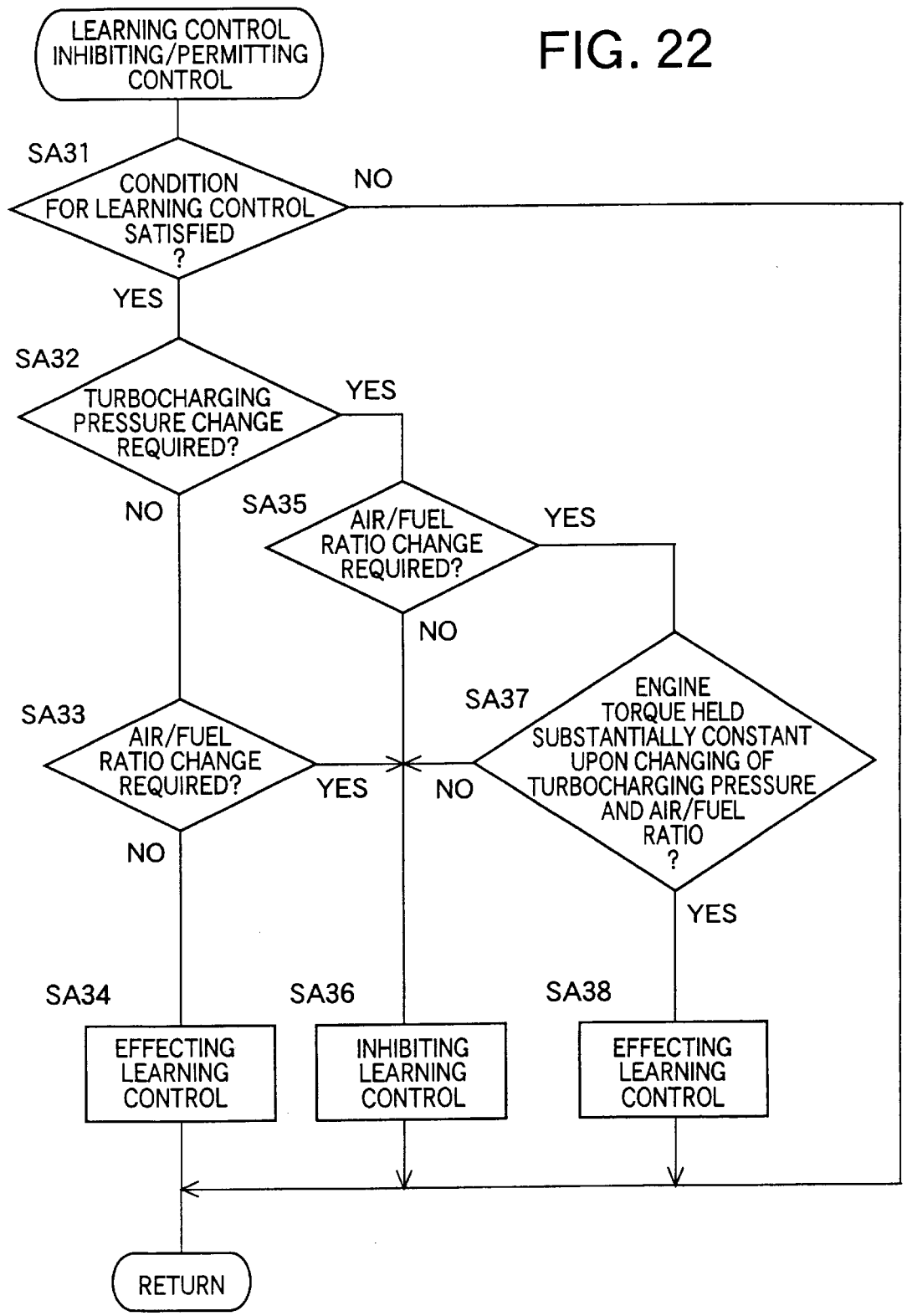
FIG. 22 is a flow chart illustrating a learning control inhibiting/permitting control routine executed by the vehicle control apparatus of FIG. 21.

Referring next to FIGS. 21 and 22, there will be described a vehicle control apparatus constructed according to a fourth embodiment of this invention. This vehicle control apparatus is applicable to the vehicle drive system partly shown in FIG. 14 and is principally constituted by the electronic control device 80 shown in FIG. 4.

Major functional means of the present vehicle control apparatus are shown in the block diagram of FIG. 21. The vehicle control apparatus includes shift control means 180, learning control means 182, turbocharging-pressure-change requirement monitoring means 184, air/fuel-ratio-change requirement monitoring means 186, learning control inhibiting means 188, simultaneous-change-requirement monitoring means 190, torque-variation-offset determining means 192, and learning control permitting means 194.

The shift control means 182 is arranged to effect a shift-up or shift-down action of the automatic transmission 16 according to the shift-up and shift-down boundary lines (described above with respect to the third embodiment) and on the basis of the detected values of the operating amount $\theta_{ACC}$ of the accelerator pedal and the running speed of the vehicle. The shifting action of the automatic transmission 16 is effected by controlling the engaging pressures of the shift control clutches and brakes C0–C2, B0–B4 of the automatic transmission 16. For instance, the so-called "clutch-to-clutch" shift-down action of the automatic transmission 16 from the $3^{rd}$-speed position down to the $2^{nd}$-speed position is effected by releasing the brake B2 while engaging the brake B3, as indicated in FIG. 2, that is, by gradually reducing the engaging pressure $P_{B2}$ of the brake B2 while gradually raising the engaging pressure $P_{B3}$ of the brake B3. Thus, the shift control means 180 functions as hydraulic pressure control means for controlling the hydraulic pressures to be applied to the hydraulically operated frictional coupling devices such as the brakes B2, B3.

The learning control means 182 is arranged to detect undesirable phenomena that may take place during the clutch-to-clutch shifting action of the automatic transmission 16, for instance, the above-indicated 3–2 shift-down action involving the releasing action of the brake B2 and the engaging action of the brake B3. The undesirable phenomena include a "die-up" of the transmission 16 due to delayed releasing of the brake B2 or early engagement of the brake B3, and an "overshooting" of the engine speed ("racing" of the engine 10) due to the early releasing of the brake B2 or delayed engagement of the brake B3. Upon detection of such an undesirable phenomenon, the learning control means 182 effects a learning compensation of a control pressure that controls the engaging pressure of the brake B3 for the 3–2 shift-down action of the automatic transmission 16, for instance, such that the degree of the die-up or the overshooting of the engine speed is reduced down to a tolerable level.

The turbocharging-pressure-change requirement monitoring means 184 is identical in function with the turbocharging-pressure-change requirement monitoring means 176 of the second embodiment described above by reference to FIG. 15. The air/fuel-ratio-change requirement monitoring means 186 is identical in function with the air/furl-ratio-change requirement monitoring means 178 of the second embodiment. The learning control inhibiting means 188 is operated when the turbocharging-pressure-change requirement monitoring means 184 and air/fuel-ratio-change requirement monitoring means 186 have determined at least one of the requirements for changing the turbocharging pressure Pa and air/fuel ratio A/F. In view of a variation of the output torque $T_E$ of the engine 10 upon changing of the turbocharging pressure Pa or air/fuel ratio A/F, the learning control inhibiting means 188 inhibits the operation of the learning control means 182 to effect the learning compensation of the control pressure.

The simultaneous-change-requirement monitoring means 190 is arranged to determine whether the turbocharging pressure Pa and the air/fuel ratio A/F are required to be simultaneously changed, that is, whether the affirmative decision is obtained by both of the turbocharging-pressure-change requirement monitoring means 184 and the air/fuel-ratio-change requirement monitoring means 186. The torque-variation-offset determining means 192 is operated when the simultaneous-change-requirement monitoring means 190 has determined that the turbocharging pressure Pa and the air/fuel ratio A/F are required to be simultaneously changed. The torque-variation-offset determining means 192 is arranged to determine whether a variation of the output torque of the engine 10 as a result of the change of the turbocharging pressure Pa and a variation of the output torque of the engine 10 as a result of the change of the air/fuel ratio A/F are substantially offset by each other, resulting in substantially no variation of the output torque of the engine 10. In the example of FIG. 17, the air/fuel ratio A/F is reduced while the turbocharging pressure Pa is lowered, as indicated by an arrow-headed line extending from point A to point B. In this case, the engine output torque is increased as a result of the reduction of the air/fuel ratio A/F, while at the same time the engine output torque is reduced as a result of the reduction of the turbocharging pressure Pa, but the engine output torque $T_E$ is eventually held substantially constant as a result of mutual offsetting of the substantially equal amounts of increase and reduction of the engine output torque due to the reductions of the air/fuel ratio A/F and turbocharging pressure Pa. The torque-variation-offset determining means 192 obtains an affirmative decision, if the amount of variation of the engine output torque as a result of the changes of the turbocharging pressure Pa and air/fuel ratio A/F is held within a predetermined range indicated by H between two broken lines in the graph of FIG. 17. The learning control permitting means 194 is arranged to permit the operation of the learning control means 182 if the torque-variation-offset determining means 192 obtains the affirmative decision, that is, determines that the variation of the output torque of the engine 10 as a result of the change of the turbocharging pressure Pa and the variation of the output torque of the engine 10 as a result of the change of the air/fuel ratio A/F are substantially offset by each other.

Referring to the flow chart of FIG. 22, there will be described a learning control inhibiting/permitting control routine executed by the vehicle control apparatus of the present fourth embodiment of the invention. This control routine is repeatedly executed with a cycle time of about several milliseconds to several tens of milliseconds. Since the shift control means (hydraulic pressure control means) 180 and the learning control means 182 are well known in the art, no description of these means 180, 182 by reference to flow charts are deemed necessary.

The learning control inhibiting/permitting control routine of FIG. 22 is initiated with step SA31 to determine whether a predetermined condition for effecting the learning compensation by the learning control means 182 is satisfied. This condition is satisfied when the temperature of the working fluid used in the vehicle drive system is held within a predetermined optimum range after a warm-up operation of the engine 10 is completed, and when the vehicle drive system is normally functioning without a failure of any components. If a negative decision (NO) is obtained in step. SA31, one cycle of execution of the present control routine is terminated. If an affirmative decision (YES) is obtained in step sA31, the control flow goes to step SA32 corresponding to the turbocharging-pressure-change requirement monitoring means 184, to determine whether the turbocharging pressure Pa is required to be changed for some reason other than controlling the operation of the engine 10 per se. If a negative decision (NO) is obtained in step SA32, the control flow goes to step SA33 corresponding to the air/fuel-ratio-change requirement monitoring means 186, to determine whether the air/fuel ratio A/F is required to be changed for some reason other than controlling the engine 10 per se. If a negative decision (NO) is obtained in step SA33, the control flow goes to step SA34 to permit and effect the learning compensation by the learning control means 182, since neither the turbocharging pressure Pa nor the air/fuel ratio A/F is being changed.

If an affirmative decision (YES) is obtained in step SA32, the control flow goes to step SA35 corresponding to the simultaneous-change-requirement monitoring means 190, to determine whether the turbocharging pressure Pa and the air/fuel ratio A/F are both required to be changed simultaneously. If a negative decision (NO) is obtained in step SA34, the control flow goes to step SA36 corresponding to the learning control inhibiting means 188, to inhibit the operation of the learning control means 182. The learning control inhibiting means 188 may be modified to permit updating of the control pressure for the shifting action of the automatic transmission 16, but inhibit the use of the updated control pressure in the next control cycle. If a negative decision (NO) is obtained in step SA34, the control flow also goes to step SA36 to inhibit the operation of the learning control means 182. Thus, when at least one of the turbocharging pressure Pa and the air/fuel ratio A/F is required to be changed, the learning control inhibiting means 188 is operated in step SA36 to inhibit the operation of the learning control means 182, except when the engine output torque is held substantially constant as a result of offsetting of the variations of the engine output torque due to changing of the turbocharging pressure Pa and the air/fuel ratio A/F, that is, except when an affirmative decision (YES) is obtained in step SA37 which will be described.

When the turbocharging pressure Pa and the air/fuel ratio A/F are both required to be changed, an affirmative decision (YES) is obtained in step SA35, and the control flow goes to step SA37 corresponding to the torque-variation-offset determining means 192, to determine whether the engine output torque is held substantially constant, irrespective of the changes of the turbocharging pressure Pa and air/fuel ratio A/F, as indicated in FIG. 17 by the arrow-headed line from point A to point B, that is, whether an increase of the engine output torque as a result of reduction of the air/fuel ratio A/F is substantially offset by a decrease of the engine output torque as a result of reduction of the turbocharging pressure Pa, with an eventual amount of variation of the engine output torque being held within the tolerable range H indicated by the two broken lines in FIG. 17. If a negative decision (NO) is obtained in step SA37, the control flow goes to step SA36 to inhibit the operation of the learning control means 182. If an affirmative decision (YES) is obtained in step SA37, the control flow goes to step SA38 corresponding to the learning control permitting means 194, to permit the operation of the learning control means 182.

As described above, the learning control inhibiting means 188 (step SA36) of the vehicle control apparatus according to the present fourth embodiment of this invention is arranged to inhibit the operation of the learning control means 182 of effecting the learning compensation of the control pressure that governs the engaging pressures of the frictional coupling devices of the automatic transmission 16, where the engine torque 10 is expected to suffer from a considerably large amount of variation of its output torque as a result of changing of at least one of the turbocharging pressure Pa and the air/fuel ratio A/F of the air-fuel mixture. Accordingly, the learning control inhibiting means 188 prevents an erroneous learning compensation of the control pressure for the frictional coupling devices. Further, the learning control permitting means 194 (step SA38) is arranged to permit the operation of the learning control means 182 when the variations of the engine output torque due to the change of the turbocharging pressure Pa and the change of the air/fuel ratio A/F are substantially offset by each other. Accordingly, the learning control permitting means 194 enables the learning control means 182 to effect the learning compensation more frequently than where the learning compensation is inhibited when the turbocharging pressure Pa and the air/fuel ratio A/F are both changed.

In summary, the present vehicle control apparatus according to the fourth embodiment includes: the turbocharging-pressure-change requirement monitoring means 184 (step SA32); the air/fuel-ratio-change requirement monitoring means 186 (steps SA33); and the learning control inhibiting means 188 (step SA36) operable for inhibiting the operation of the learning control means 182 of controlling the control pressure (engaging pressures) for the frictional coupling devices of the automatic transmission 16, when the monitoring means 184, 186 has determined that at least one of the turbocharging pressure Pa and air/fuel ratio A/F is required to be changed. The present vehicle control apparatus further includes: the simultaneous-change-requirement monitoring means 190 (steps SA32 and SA35) operable for determining whether the turbocharging pressure Pa and air/fuel ratio A/F are both required to be changed; the torque-variation-offset determining means 192 (step SA37) operable to determine whether the variations of the engine output torque due to the changes of the turbocharging pressure Pa and air/fuel ratio A/F are substantially offset by each other; and the learning control permitting means 194 (step SA38) operable for permitting the operation of the learning control means 182, when the torque-variation-offset determining means 192 has determined that the variations of the engine output torque due to the changes of the turbocharging pressure Pa and the air/fuel ratio A/F are substantially offset by each other.

While the vehicle control apparatus according to the fourth embodiment includes the hydraulic pressure control means in the form of the shift control means 180 for controlling the engaging pressures of the brakes B2, B3 of the automatic transmission 16, the hydraulic pressure control means may be lock-up clutch control means for controlling the engaging pressure of the lock-up clutch 26, or drive-force distribution control means for controlling the engaging pressure of a drive-force distribution clutch or differential limiting clutch (not shown). That is, the principle of the fourth embodiment is applicable to any hydraulic pressure control means operable for controlling the hydraulic pressure to be applied to a hydraulically operated power transmitting device disposed in a power transmission path between the engine 10 and the drive wheels of the vehicle. In the vehicle drive system includes a continuously variable transmission of belt-and-pulley type having two pulleys whose effective diameters are changed by respective two hydraulic cylinders, and a belt connecting the two pulleys, the hydraulic pressure control means may be adapted to control the hydraulic pressure in one of the two hydraulic cylinders, for regulating the tension of the belt.

While the first through fourth embodiments of the present invention have been described above, the present invention may be otherwise embodied.

In the illustrated embodiments, the engine 10 is a lean-burn engine which is provided with the turbocharger 54 and is operated in a lean-burn state under a relatively low load. However, the lock-up clutch control apparatus and the lean-burn engine control apparatus according to the present invention may be used for a vehicle drive system wherein the lean-burn engine is provided with a swirl control valve as well as the turbocharger 54. In essence, the principle of the present invention is applicable to a vehicle drive system including a lean-burn engine of any type which is operable in a turbocharging state at a relatively low speed between 1500 r.p.m. and 2500 r.p.m., for instance. In this turbocharging state in which the engine is in the lean-burn state with the intake air injected into the cylinders to provide a cooling effect, the charging efficiency of the engine is improved, and the knocking tendency of the engine is reduced so that the need of retarding the ignition timing to reduce the knocking tendency is reduced, whereby the reduction of the output torque of the engine due to the retardation of the ignition timing is accordingly reduced. In the turbocharging lean-burn state of the engine, therefore, the stability of the combustion state of the engine increases with an increase in the turbocharging pressure $P_{IN}$, and the output torque of the engine increases with the turbocharging pressure.

While the first and second lock-up clutch control relationships defined in the two-dimensional coordinate system in the graphs of FIGS. 7 and 8 represent the engaging area (releasing area) and the slip control area, those relationships may represent or define only the engaging area (releasing area) or the slip control area.

Although the automatic transmission 16 has the five forward drive positions, the vehicle drive system may use a continuously variable transmission the speed ratio of which is continuously variable.

Although the lock-up clutch control means 96 in the first embodiment and the loc-up clutch control means 101 are operated to control the lock-up clutch 26 while the automatic transmission 16 is placed in the $4^{th}$-speed or $5^{th}$-speed position, those lockup clutch control mean 96, 101 may also be operated while the automatic transmission 16 is placed in a lower-speed position such as the $3^{rd}$-speed position.

The turbocharger 54 provided in the vehicle drive system shown in FIGS. 3 and 14 is of exhaust turbocharger type in which the turbine impeller 56 is driven by a stream of the exhaust emission from the engine 10. However, the turbocharger may be turbosupercharger of mechanical type in which the turbine impeller is mechanically driven by an electric motor or engine 10.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. An apparatus for controlling a drive system of an automotive vehicle including an engine operable at variable supercharging pressure and air/fuel ratio of an air-fuel mixture, and a hydraulically operated power transmitting device disposed in a power transmitting path between said engine and a drive wheel of the automotive vehicle, said apparatus comprising:

hydraulic pressure control means for controlling a hydraulic pressure to be applied to said power transmitting device;

learning control means for effecting learning compensation of said hydraulic pressure controlled by said hydraulic pressure control means;

learning control inhibiting means operable when an amount of variation of an output torque of said engine as a result of at least one of a change of said supercharging pressure and a change of said air/fuel ratio is larger than a predetermined threshold, for inhibiting an operation of said learning control means; and leaning control permitting means operable when a variation of the output torque of said engine as a result of the change of said supercharging pressure and a variation of said output torque as a result of said air/fuel ratio are substantially offset by each other, for permitting the operation of said learning control means.

2. An apparatus according to claim 1, further comprising:

supercharging-pressure-change requirement monitoring means for determining whether said change of said supercharging pressure is required; and air/fuel-ratio-change requirement monitoring means for determining whether said change of said air/fuel ratio is required, and wherein said learning control inhibiting means inhibits the operation of said learning control means when said supercharging-pressure-change requirement monitoring means and said air/fuel-ratio-change requirement monitoring means have determined that only one of the changes of the supercharging pressure and the air/fuel ratio is required.

3. An apparatus according to claim 2, further comprising:

simultaneous-change requirement monitoring means for determining whether both of the changes of the supercharging pressure and the air/fuel ratio are simultaneously required; and torque-variation-offset determining means for determining whether said amounts of variation of the output torque of the engine as a result of the respective changes of the supercharging pressure and the air/fuel ratio are substantially offset by each other, and wherein said learning control permitting means permits the operation of said learning control means, when said torque-variation-offset determining means has determined that said amounts of variation are substantially offset by each other, and said learning control inhibiting means inhibits the operation of said learning control means, when said torque-variation-offset determining means has not determined that said amounts of variation are substantially offset by each other.

4. An apparatus according to claim 1, wherein said engine is a lean-burn engine which provided with a supercharger and operable in a supercharging state with an operation of said supercharger, such that said supercharging pressure to be established by said supercharger is variable.

* * * * *